US010125807B2

(12) United States Patent
Furu-Szekely et al.

(10) Patent No.: US 10,125,807 B2
(45) Date of Patent: Nov. 13, 2018

(54) LOCKING MECHANISMS WITH DEFLECTABLE WASHER MEMBERS

(71) Applicant: Enduralock, LLC., Overland Park, KS (US)

(72) Inventors: Zoltan Kalman Furu-Szekely, Cypres, TX (US); Harold Hess, Leawood, KS (US)

(73) Assignee: Enduralock, LLC, Overland Park, KS (US)

( * ) Notice: Subject to any disclaimer, the term of this patent is extended or adjusted under 35 U.S.C. 154(b) by 110 days.

(21) Appl. No.: 15/258,847

(22) Filed: Sep. 7, 2016

(65) Prior Publication Data
US 2017/0067501 A1 Mar. 9, 2017

Related U.S. Application Data

(60) Provisional application No. 62/220,867, filed on Sep. 18, 2015, provisional application No. 62/215,631, filed on Sep. 8, 2015.

(51) Int. Cl.
*F16B 39/10* (2006.01)
*F16B 39/282* (2006.01)
*F16B 39/24* (2006.01)

(52) U.S. Cl.
CPC ............ *F16B 39/282* (2013.01); *F16B 39/10* (2013.01); *F16B 39/24* (2013.01)

(58) Field of Classification Search
CPC .......... F16B 37/02; F16B 39/02; F16B 39/10; F16B 39/12; F16B 39/14; F16B 39/24; F16B 39/28; F16B 39/282
(Continued)

(56) References Cited

U.S. PATENT DOCUMENTS 307,671 A * 11/1884 McTighe ................ F16B 39/14
411/247
545,516 A 9/1895 Mershon
(Continued)

FOREIGN PATENT DOCUMENTS

JP 07217634 8/1995
JP H084743 A 1/1996
(Continued)

OTHER PUBLICATIONS

International Search Report and writing opinion for PCT/US 16/50534, dated Feb. 6, 2017, 11 pages.
(Continued)

*Primary Examiner* — Roberta S Delisle
(74) *Attorney, Agent, or Firm* — Armstrong Teasdale LLP

(57) ABSTRACT

A fastener assembly includes a threaded member, a lock nut, and a lock washer. The threaded member has a pair of opposing flat sections formed in the threaded portion of the threaded member. The lock nut is configured to threadably engage the threaded member and includes a flange having a plurality of axially extending teeth. The lock washer includes a flat central portion with an aperture. The aperture has a pair of opposing flat inner surfaces configured to engage the opposing flat sections of the threaded member to rotationally fix the lock washer. The lock washer also includes at least one outer portion extending upward from the flat central portion at a predetermined angle. The outer portion includes a plurality of locking apertures configured to receive the plurality of axially extending teeth of the lock nut.

11 Claims, 35 Drawing Sheets

(58) Field of Classification Search
USPC ......... 411/190, 191–192, 204, 205, 208, 209
See application file for complete search history.

(56) References Cited

U.S. PATENT DOCUMENTS

| | | | |
|---|---|---|---|
| 646,337 A | 3/1900 | Wilson et al. | |
| 771,733 A * | 10/1904 | Johnson | F16B 39/12 411/245 |
| 779,632 A | 1/1905 | Wolf | |
| 826,591 A * | 7/1906 | Mohr | F16B 39/14 411/247 |
| 848,176 A | 3/1907 | Jordan | |
| 892,507 A | 7/1908 | Dorsey | |
| 898,003 A * | 9/1908 | Posson | F16B 39/12 411/223 |
| 907,473 A | 12/1908 | De Tray | |
| 955,054 A | 4/1910 | Averno et al. | |
| 961,371 A | 6/1910 | Posey | |
| 1,011,871 A | 12/1911 | Smoke | |
| 1,057,209 A | 3/1913 | Andrews | |
| 1,075,925 A | 10/1913 | Maxwell | |
| 1,140,974 A | 5/1915 | Formby | |
| 1,225,626 A | 5/1917 | Hannon et al. | |
| 1,246,353 A | 11/1917 | Thigpen | |
| 1,249,336 A | 12/1917 | Cook | |
| 1,276,882 A * | 8/1918 | Davis | F16B 39/14 411/247 |
| 1,287,371 A * | 12/1918 | McClay et al. | F16B 39/12 279/100 |
| 1,289,710 A | 12/1918 | Ervin | |
| 1,337,424 A | 4/1920 | Word | |
| 1,403,902 A | 1/1922 | Fields | |
| 1,509,948 A | 9/1924 | Hall | |
| 1,526,914 A | 2/1925 | Kibler | |
| 2,018,574 A | 10/1935 | Richter | |
| 2,131,812 A * | 10/1938 | Maguire | F16B 39/10 411/191 |
| 2,141,701 A | 12/1938 | Uherkovich | |
| 2,398,965 A | 4/1946 | Rounds | |
| 3,294,140 A | 12/1966 | Cosenza | |
| 3,712,355 A * | 1/1973 | Schenk | F16B 5/0208 411/105 |
| 5,190,423 A | 3/1993 | Ewing | |
| 5,460,468 A | 10/1995 | DiStacio | |
| 5,533,852 A | 7/1996 | Matthews | |
| 5,538,378 A | 7/1996 | Van Der Drift | |
| 5,575,602 A | 11/1996 | Savage et al. | |
| 5,597,278 A | 1/1997 | Peterkort | |
| 5,618,143 A | 4/1997 | Cronin, II et al. | |
| 5,713,708 A | 2/1998 | Van Der Drift et al. | |
| 5,735,853 A | 4/1998 | Olerud | |
| 5,951,224 A | 9/1999 | DiStasio | |
| 6,010,289 A | 1/2000 | DiStasio et al. | |
| 6,082,941 A | 7/2000 | Dupont et al. | |
| 6,139,550 A | 10/2000 | Michelson | |
| 6,258,089 B1 | 7/2001 | Campbell et al. | |
| 6,261,291 B1 | 7/2001 | Talaber et al. | |
| 6,361,257 B1 | 3/2002 | Grant | |
| 6,383,186 B1 | 5/2002 | Michelson | |
| 6,398,783 B1 | 6/2002 | Michelson | |
| 6,413,259 B1 | 7/2002 | Lyons et al. | |
| 6,434,792 B1 | 8/2002 | Williamson | |
| 6,602,255 B1 | 8/2003 | Campbell et al. | |
| 6,626,907 B2 | 9/2003 | Campbell et al. | |
| 6,695,846 B2 | 2/2004 | Richelsoph et al. | |
| 6,755,833 B1 | 6/2004 | Paul et al. | |
| 6,935,822 B2 | 8/2005 | Hartmann et al. | |
| 6,976,817 B1 | 12/2005 | Grainger | |
| 7,128,511 B2 * | 10/2006 | Hewgill | F16B 21/183 411/149 |
| 7,189,044 B2 | 3/2007 | Ball | |
| 7,270,509 B2 | 9/2007 | Disantis et al. | |
| 7,318,825 B2 | 1/2008 | Butler et al. | |
| 7,374,495 B2 | 5/2008 | Ball | |
| 7,621,943 B2 | 11/2009 | Michelson | |
| 7,763,056 B2 | 7/2010 | Dalton | |
| 7,857,839 B2 | 12/2010 | Duong et al. | |
| 7,887,547 B2 | 2/2011 | Campbell et al. | |
| 7,909,859 B2 | 3/2011 | Mosca et al. | |
| 7,955,037 B2 | 6/2011 | Disantis et al. | |
| 8,123,788 B2 | 2/2012 | Michelson | |
| 8,262,711 B2 | 9/2012 | Hess | |
| 8,366,365 B2 | 2/2013 | Disantis et al. | |
| 8,727,684 B1 * | 5/2014 | Woods | F16B 39/284 411/192 |
| 2005/0207865 A1 | 9/2005 | Disantis et al. | |
| 2005/0209599 A1 | 9/2005 | Brunsvold | |
| 2006/0015104 A1 | 1/2006 | Dalton | |
| 2009/0060682 A1 | 3/2009 | Yeh et al. | |
| 2009/0192553 A1 | 7/2009 | Maguire et al. | |
| 2010/0121383 A1 | 5/2010 | Stanaford et al. | |
| 2011/0188970 A1 | 8/2011 | Dillon et al. | |
| 2012/0063864 A1 | 3/2012 | Hess | |
| 2014/0190315 A1 | 7/2014 | Kiser | |
| 2014/0356097 A1 | 12/2014 | Hess et al. | |

FOREIGN PATENT DOCUMENTS

| | | |
|---|---|---|
| KR | 200241791 | 10/2001 |
| KR | 20100863200 | 10/2008 |
| KR | 2011-0099247 A | 9/2011 |

OTHER PUBLICATIONS

TineLok: Overview, www.tinelok.com (2013).

TineLok, The Revolutionary Vibration-Proof Fastener System, www.tinelok.com (2013).

* cited by examiner

LOCKING MECHANISMS WITH DEFLECTABLE WASHER MEMBERS

CROSS REFERENCE TO RELATED APPLICATIONS

This application claims priority to U.S. Provisional Patent Application Ser. No. 62/215,631, filed Sep. 8, 2015, and U.S. Provisional Patent Application Ser. No. 62/220,867, filed Sep. 18, 2015, each of which is incorporated herein by reference in its entirety.

BACKGROUND

The field of the disclosure relates generally to fasteners, and more specifically to locking mechanisms for threaded fasteners.

Fasteners commonly include mechanisms for ensuring that fastener elements do not loosen over time, potentially allowing joined elements to loosen or separate. Examples of mechanisms include thread bore inserts, and screw thread profiles that deform when tightened. Fasteners accessories like lock washers, cotter pins, and lock wires are also commonly used with fasteners to prevent fastener elements from loosening. Adhesive materials, like epoxy, can be applied to fastener threads to stake fastener elements to prevent fastener elements from loosening. Conventional fastener mechanisms, accessories, and adhesive materials may not be suitable for some applications, such as high temperature environments or with structures subject to vibration.

Such conventional mechanisms, accessories, and adhesive materials have generally been considered satisfactory for their intended purpose. However, there is still a need in the art for improved fasteners. The present disclosure provides a solution for this need.

BRIEF DESCRIPTION

In one aspect, a fastener assembly is provided. The fastener assembly includes a threaded member having a threaded body portion and at least one anti-rotation feature formed in the threaded body portion. The fastener assembly also includes a lock nut configured to threadably engage the threaded member. The lock nut includes a plurality of axially extending teeth. Moreover, the fastener assembly includes a lock washer having a central portion and at least one outer portion. The central portion has an aperture extending therethrough. The central portion includes an anti-rotation structure configured to engage the at least one anti-rotation feature of the threaded member and rotationally fix the lock washer with respect to the threaded member. The at least one outer portion extends upward from the central portion at a predetermined angle and includes a top surface substantially parallel to the central portion. The top surface includes a plurality of locking apertures defined therein, wherein each locking aperture of the plurality of locking apertures is configured to receive a respective tooth of the plurality of axially extending teeth.

In another aspect, another fastener assembly is provided. The fastener assembly includes a threaded member having a threaded body portion and at least one anti-rotation feature formed in the threaded body portion. The fastener assembly also includes a lock nut configured to threadably engage the threaded member. The lock nut includes a body and a plurality of radially extending teeth. In addition, the fastener assembly includes a lock washer including a central portion and at least one outer portion. The central portion has an aperture extending therethrough. The central portion includes a pair of opposing flat inner surfaces configured to slidably engage the opposing flat sections of the threaded member and rotationally fix the lock washer with respect to the threaded member. The at least one outer portion includes an end having a plurality of teeth defined therethrough. The at least one outer portion extends outward from the flat central portion and includes a 180° bend, wherein the plurality of teeth extend toward the flat central portion. The plurality of teeth is configured to engage the plurality of teeth.

In yet another aspect, another fastener assembly is provided. The fastener assembly includes a threaded member having a threaded body portion and a pair of opposing flat sections formed in the threaded body portion. The fastener assembly also includes a lock nut configured to threadably engage the threaded member. The lock nut includes a plurality of radially extending teeth. The fastener assembly includes a lock washer having a flat central portion and at least one outer portion. The central portion includes an aperture extending therethrough. The at least one outer portion extends outward from the central portion and includes a first 90° bend such that the at least one outer portion extends axially away from the central portion and a second 90° bend defining an end portion extending planarly outward from the central portion. The end portion includes a plurality of locking teeth formed on an upper surface of said end portion. The plurality of locking teeth is configured to engage the plurality of teeth.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The fastening devices and systems described herein overcome many of the prior art problems associated with threaded fasteners. In general, threaded fasteners are used to fixedly connect two or more pieces in a variety of applications such as, without limitation, surgical implants, industrial applications, aerospace applications, and building applications. Among other features and benefits, the disclosed fastening devices and systems facilitate one or more of quick and easy installation and/or removal, reduced torque requirements, vibration resistant secured tightness, and/or single end access for blind fastening applications. The advantages, and other features of the technology disclosed herein, will become more readily apparent to those having ordinary skill in the art from the following detailed description of certain preferred embodiments taken in conjunction with the drawings.

Figure 1:
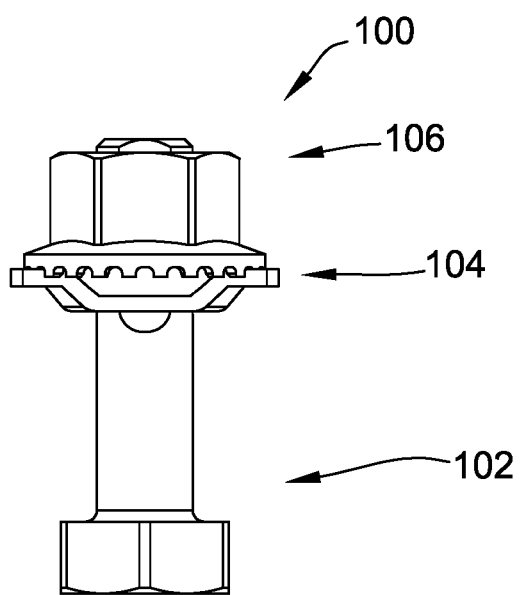
FIG. 1 is a side view of an exemplary embodiment of a fastener assembly.
Figure 2:
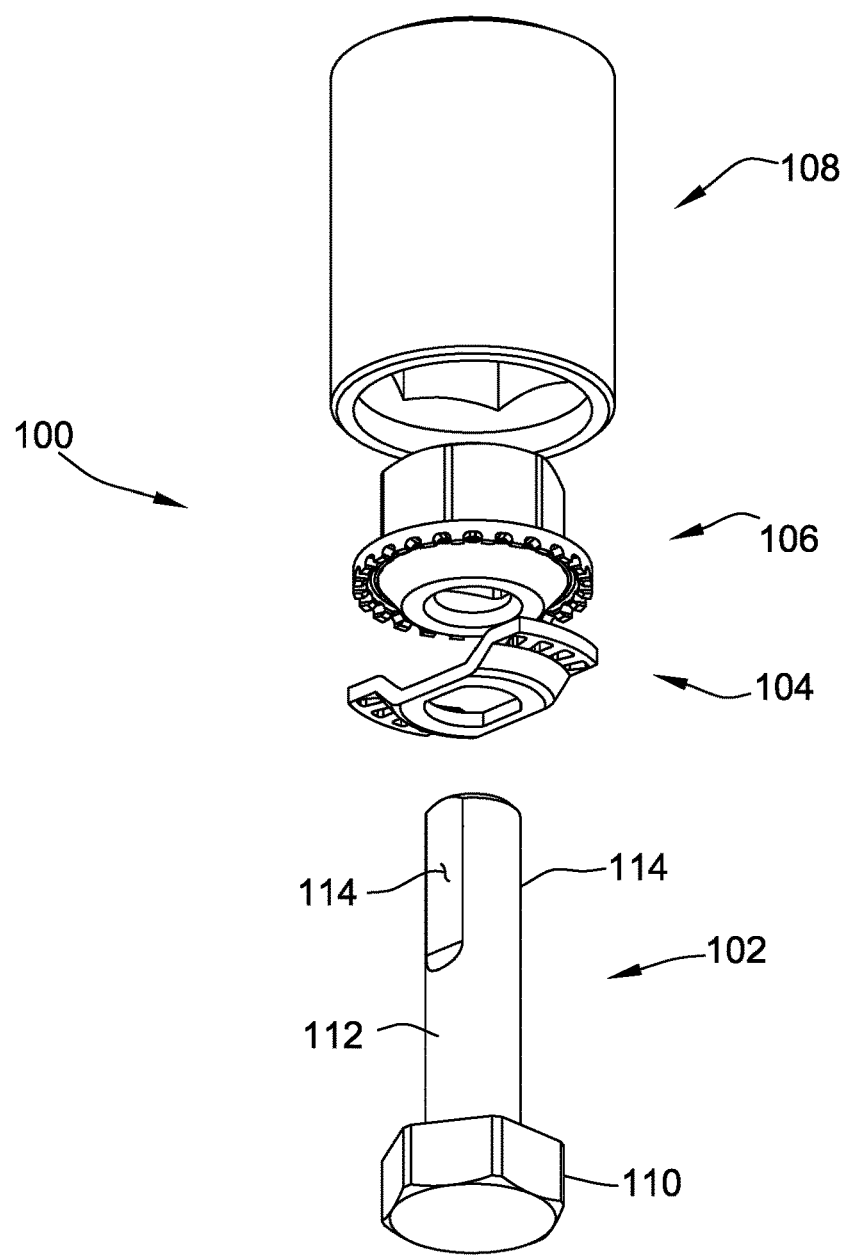
FIG. 2 is an exploded perspective view of the fastener assembly shown in FIG. 1, including a tool for use with the fastener assembly.
Figure 3:
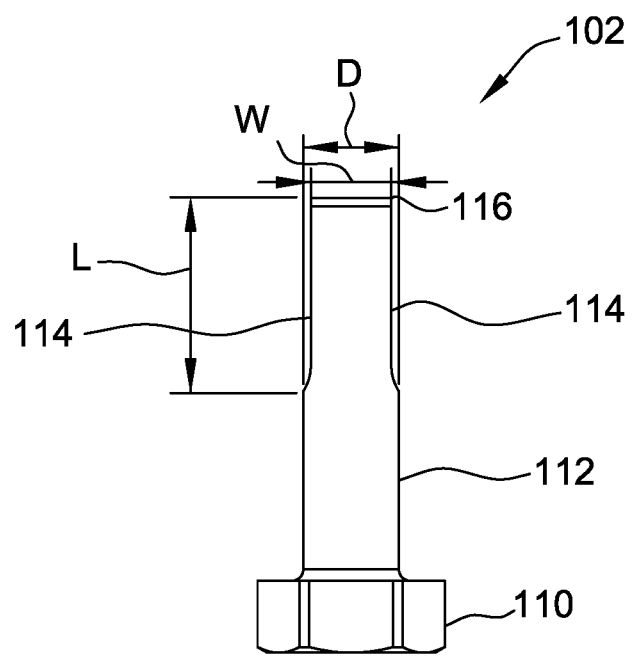
FIG. 3 is a side view of a threaded member of the fastener assembly of FIG. 1.

FIG. 1 is a side view of an exemplary embodiment of a fastener assembly 100. FIG. 2 is an exploded perspective view of fastener assembly 100, including a tool 108 for use with fastener assembly 100. FIG. 3 is a side view of a threaded member 102 of fastener assembly 100 (shown in FIG. 1). In the exemplary embodiment, fastener assembly 100 includes threaded member 102, a lock washer 104, a lock nut 106, and a tool 108. As described with reference to FIGS. 2 and 3, threaded member 102 includes a head portion 110, an elongated threaded body portion 112 extending axially from head portion 110, and at least one banking feature, or anti-rotation feature 114. Alternatively, threaded member 102 may be free of head portion 110. For example, and without limitation, threaded member 102 may be a threaded rod, a bolt, a screw, or any other threaded component that enables fastener assembly 100 to function as described herein.

In the exemplary embodiment, anti-rotation features 114 includes a pair of opposing longitudinally extending sections formed in threaded body portion 112. It is contemplated that anti-rotation features 114 includes, for example, and without limitation, flats, notches, grooves, or any other feature that enables threaded member 102 to function as described herein. Threaded body portion 112 has a diameter "D," defining a size of threaded member 102. In the exemplary embodiment, anti-rotation features 114 include a pair of flat portions that are parallel to each other and are spaced apart a width "W," which is smaller than diameter "D." Anti-rotation features 114 are substantially equal in size and shape, and extend along threaded body portion 112 from an end 116 of threaded member 102 a predefined length "L." It is contemplated that anti-rotation features 114 can extend any length "L" along threaded body portion 112, up to and including extend to head portion 110. In the exemplary embodiment, as shown in FIG. 2, head portion 110 is a hexagonal head. Alternatively, head portion 110 is any form, for example, and without limitation, a spline head, a socket cap, a tulip head, and a pan head, that enables fastener assembly 100 to function as described herein.

Figure 4:
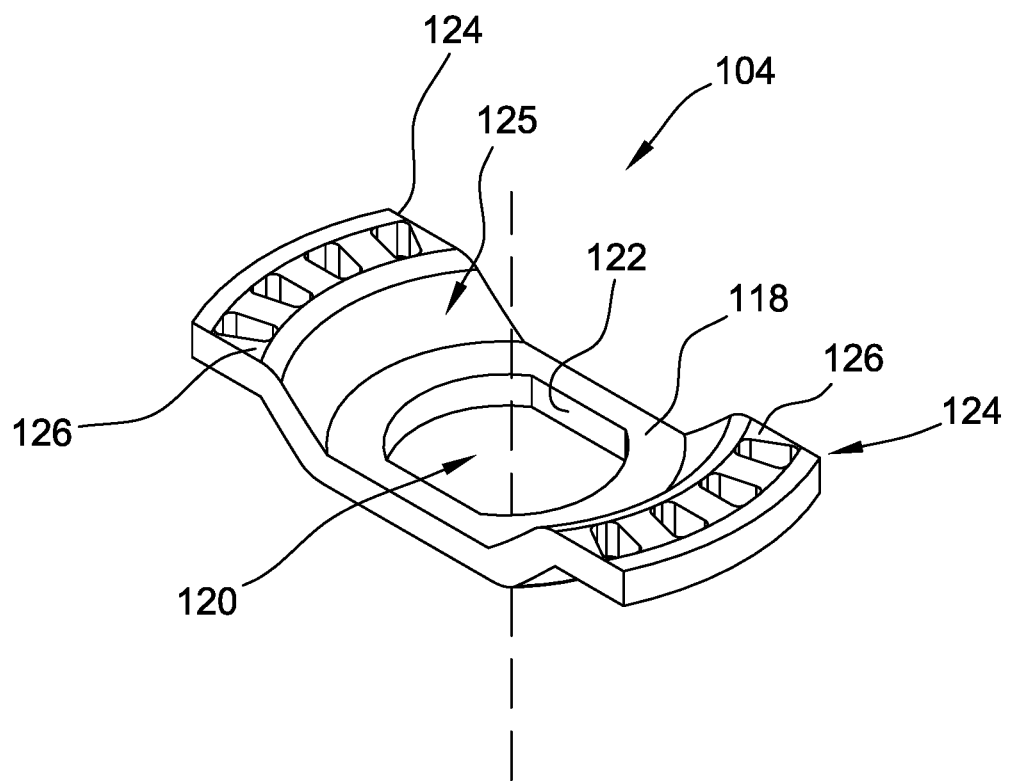
FIG. 4 is a perspective view of a lock washer of the fastener assembly of FIG. 1.
Figure 5:
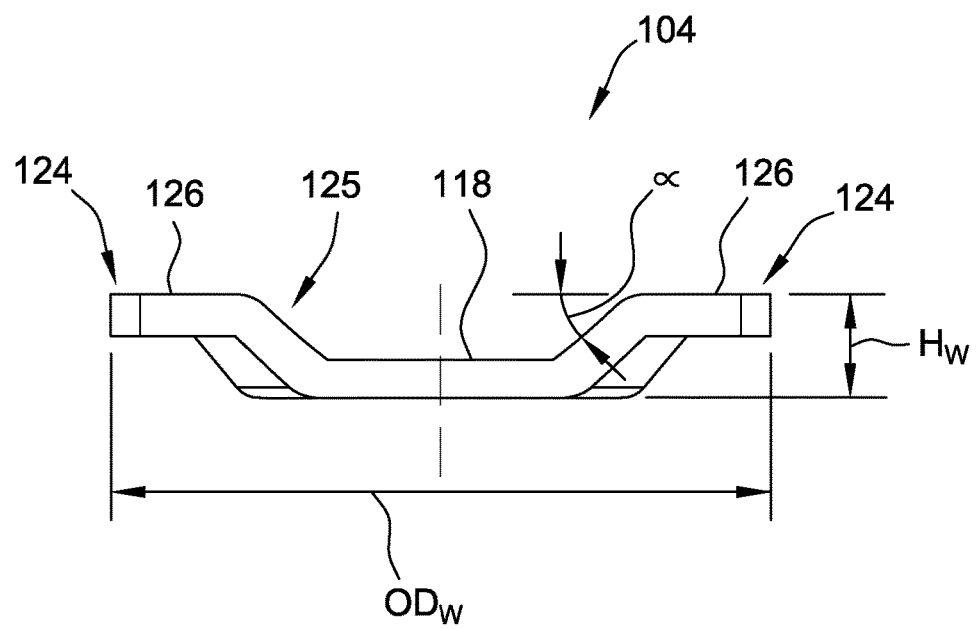
FIG. 5 is a front view of the lock washer of FIG. 4.
Figure 6:
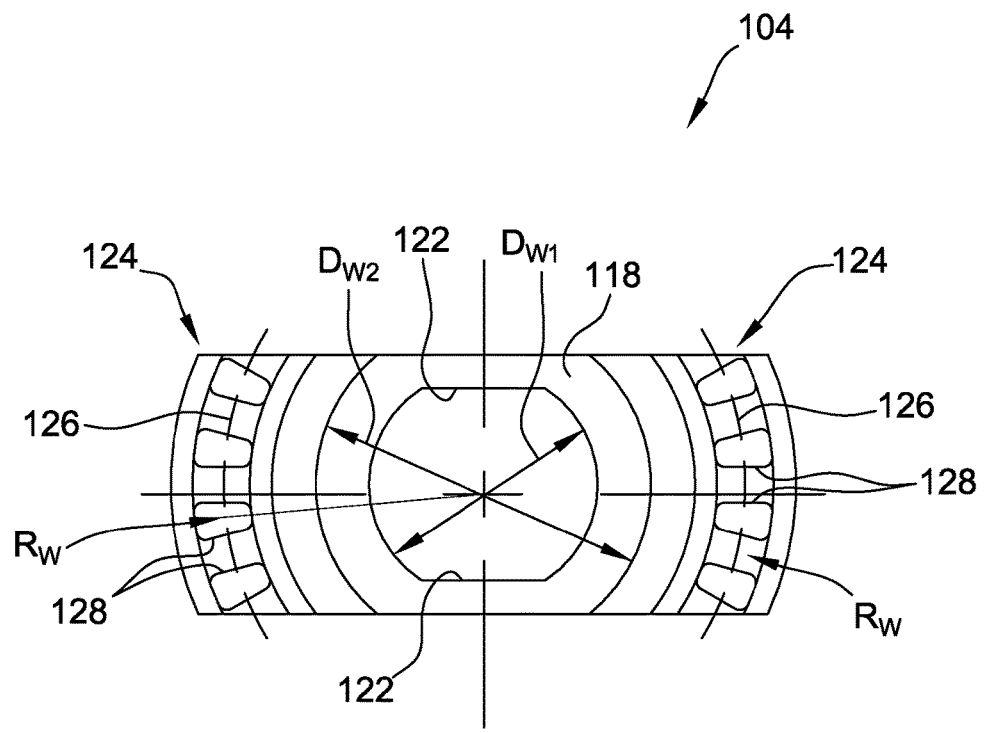
FIG. 6 is a top view of the lock washer of FIG. 4.

With reference to FIGS. 1 and 2, lock washer 104 is configured to slidably couple to anti-rotation features 114 of threaded body portion 112 for axial movement along threaded body portion 112. Anti-rotation features 114 facilitate rotationally fixing lock washer 104 relative to the threaded member 102. With reference to FIGS. 4-6, lock washer 104 includes a central portion 118 defining an axial aperture 120 therethrough. Axial aperture 120 is sized to facilitate freely sliding lock washer 104 onto threaded body portion 112 of threaded member 102. As such, axial aperture 120 has a diameter "$D_{w1}$" slightly greater than diameter "D" of threaded body portion 112. Axial aperture 120 also includes an anti-rotation structure 122 configured to engage anti-rotation feature 114 of threaded member 102. It is contemplated that anti-rotation structure 122 includes, for example, and without limitation, a finger, member or any other component configured to engage anti-rotation feature 114, for example, flats, notches, or grooves. In the exemplary embodiment, anti-rotation structure 122 includes a pair of opposing flat inner surfaces sized and shaped to correspond to the pair of opposing longitudinally extending anti-rotation features 114 of threaded body portion 112. Anti-rotation features 114 slidably couple with anti-rotation structures 122 of lock washer 104 to rotationally fix lock washer 104 when threaded body portion 112 is inserted in axial aperture 120. As such, lock washer 104 moves freely along threaded body portion 112 in the axial direction.

Figure 7:
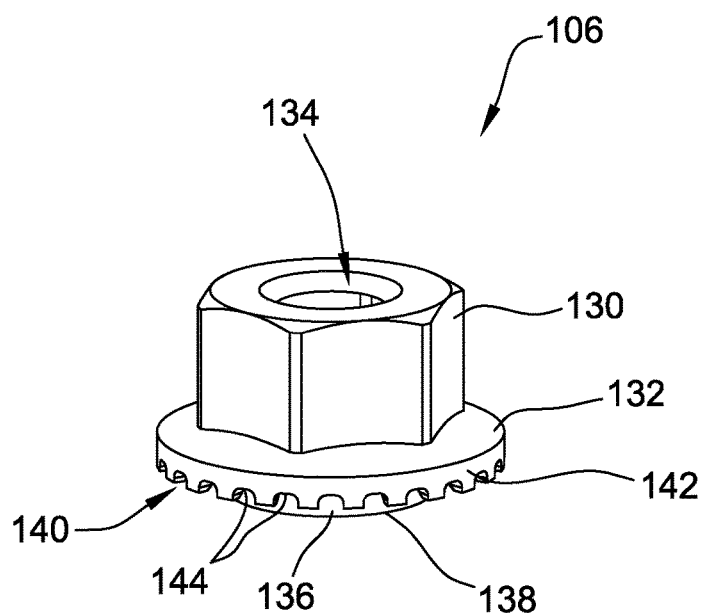
FIG. 7 is a perspective view of a lock nut of the fastener assembly of FIG. 1.
Figure 8:
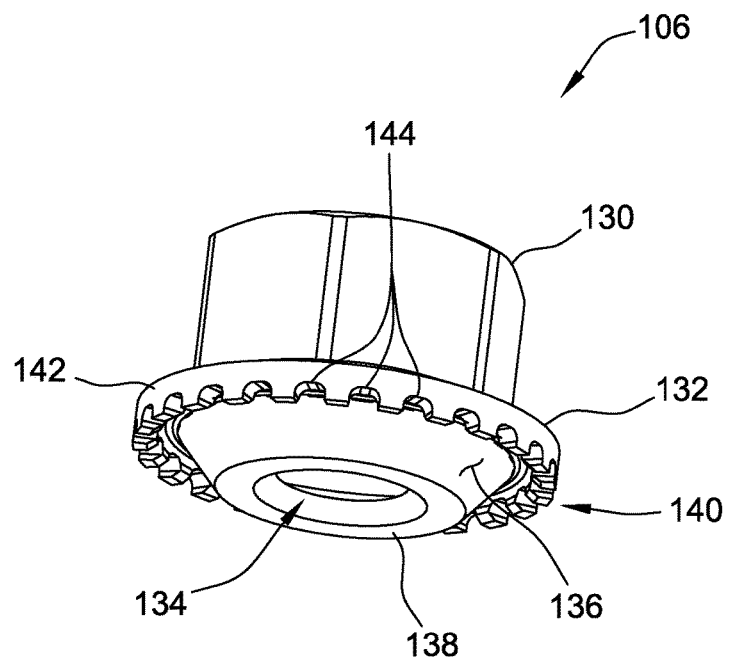
FIG. 8 is a front view of the lock nut of FIG. 7.

In the exemplary embodiment, lock washer 104 includes an outer portion 124 having an outer diameter or width "$OD_w$." In the exemplary embodiment, outer portion 124 includes pair of opposing outer portions 124 that generally define an outer circumference of lock washer 104. Alternatively, outer portion 124 can be a full circumferential portion or any number of smaller radial portions or tabs that enable lock washer 104 to function as described herein. In the exemplary embodiment, outer portion 124 includes a pair of opposing outer tabs. Outer portions 124 extend upward from central portion 118. In particular, outer portions 124 extend upward from a boundary diameter "$D_{w2}$" and at an angle "$\alpha$" defined to correspond to a mating surface of lock nut 106 forming a curved tapered portion 125 for receiving a conical bearing surface 136 (shown in FIGS. 7-9) of lock nut 106. As such, diameter "$D_{w2}$" corresponds to a size of lock nut 106, and angle "$\alpha$" is any angle that enables lock washer 104 to couple to conical bearing surface 136 of lock nut 106, as described herein. Outer portions 124 extend upward a predetermined height "$H_w$" which corresponds to a size of lock nut 106, such that lock washer 104 couples to lock nut 106, as described herein. Outer portions 124 include a top surface 126 that is substantially parallel to central portion 118. A plurality if locking apertures 128 are defined at least partially through top surface 126. Locking apertures 128 are circumferentially equally spaced and located on a radial line at radial distance "$R_w$" from a center point of lock washer 104. In the exemplary embodiment, locking apertures 128 are trapezoidal in shape to correspond to teeth 144 (shown in FIGS. 7-9) of lock nut 106. Alternatively, locking apertures 128 have any shape and size that enables fastener assembly 100 to function as described herein.

Figure 9A:
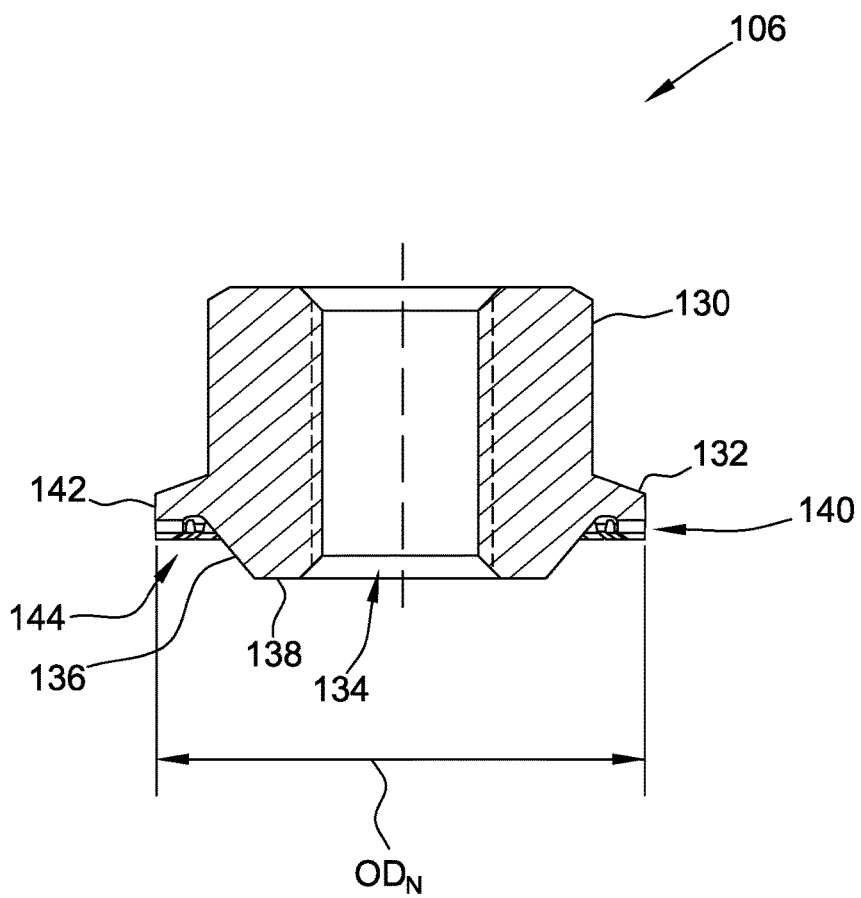
FIG. 9A is a sectional view of the lock nut of FIG. 7.
Figure 9B:
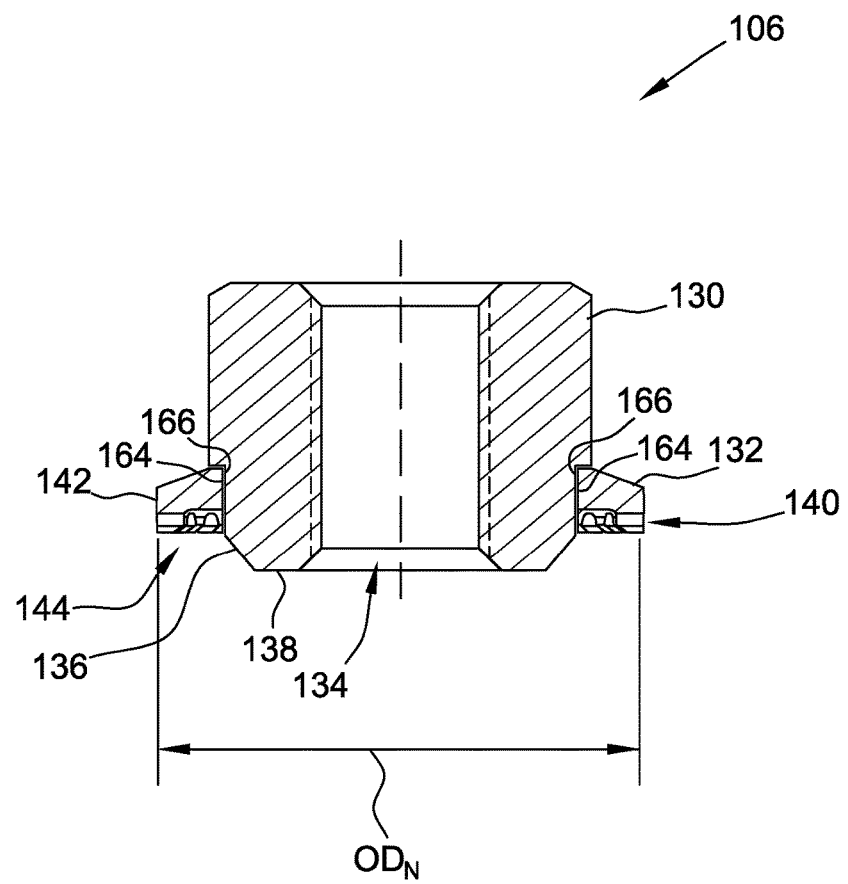
FIG. 9B is a sectional view of an alternative embodiment of the lock nut of FIG. 7.

With reference to FIGS. 1 and 2, lock nut 106 is configured to be threadably received by threaded member 102 over threaded body portion 112 and is rotationally free or rotationally fixed relative to threaded member 102 depending upon whether lock nut 106 is engaged with or disengaged from lock washer 104. With reference to FIGS. 7-9B, lock nut 106 includes a body 130 and a transversely extending flange 132 proximate a first end 138 of lock nut 106. With reference to FIG. 9A, in the exemplary embodiment, flange 132 is integrally formed with body 130. Alternatively, as shown in FIG. 9B, flange 132 is separately formed from body 130 and is releasably coupled to body 130. In such an embodiment, flange 132 is rotationally fixed to body 130 via engagement of one or more anti-rotation features 164 to one or more corresponding anti-rotation structures 166 of body 130 of lock nut 106. For example, and without limitation, anti-rotation features 164 can include a tab configured to couple to a slot 166 formed in body 130, or can include a generally planar surface configured to couple to a corresponding planar surface formed on body 130. In alternative embodiments, lock nut 106 is free of flange 132. With reference to FIGS. 7-9A, in the exemplary embodiment, flange 132 has a diameter "$OD_n$." Body 130 includes a threaded bore 134 extending axially through lock nut 106. Lock nut 106 includes a conical bearing surface 136 formed at first end 138, below flange 132. In the exemplary embodiment, conical bearing surface 136 is configured to engage curved tapered portion 125 of lock washer 104. Body 130 is formed as a hexagonal-shaped body, although other configurations of body 130 are contemplated.

In the exemplary embodiment, flange 132 includes a peripherally extending lip 140 that projects downward from flange 132 generally adjacent a circular outer edge 142 of flange 132. Lock nut 106 includes a plurality of axially extending teeth 144 formed in lip 140. In particular, teeth 144 extend radially inward from circular outer edge 142 of flange 132 in equal, circumferentially-spaced relationships to each other and project downward in an axial direction. Alternatively, in embodiments without flange 132, axially extending teeth 144 are formed in body 130. In the exemplary embodiment, teeth 144 include a plurality of arcuate (in circumferential extension) channels that extend radially inward from circular outer edge 142 through lip 140. It is understood that, in other embodiments, teeth 144 are configured to have any other suitable shape that enables lock nut 106 to function as described herein. In the exemplary embodiment, lock nut 106 includes twenty-four teeth 144. Alternatively, lock nut 106 has any number of teeth 144 that enable lock nut 106 to function as described herein.

In the exemplary embodiment, threaded member 102, lock washer 104, and lock nut 106 are fabricated from a metal, for example, and without limitation, steel, aluminum, titanium, or a superalloy. Alternatively, threaded member 102, lock washer 104, and lock nut 106 are fabricated from any material that enables fastener assembly 100 to function as described herein, such as, without limitation, composite materials, resins, fiber reinforced resins, plastics, and fiber reinforced plastics.

Figure 10:
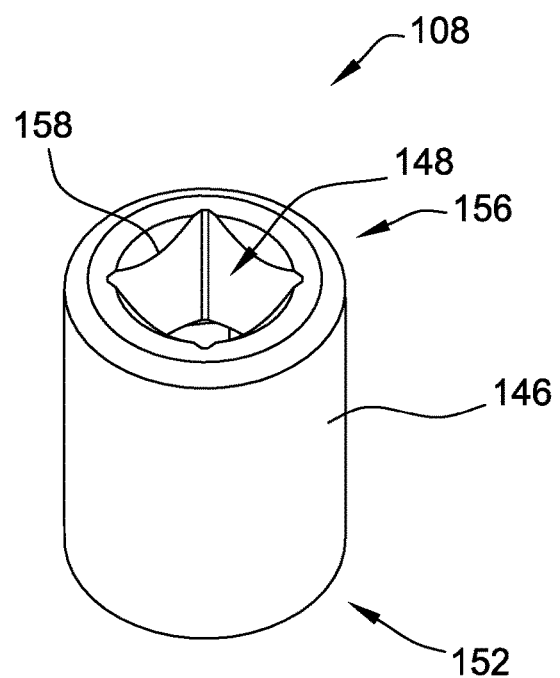
FIG. 10 is an upper perspective view of a tool for use with the fastener assembly of FIG. 1.
Figure 11:
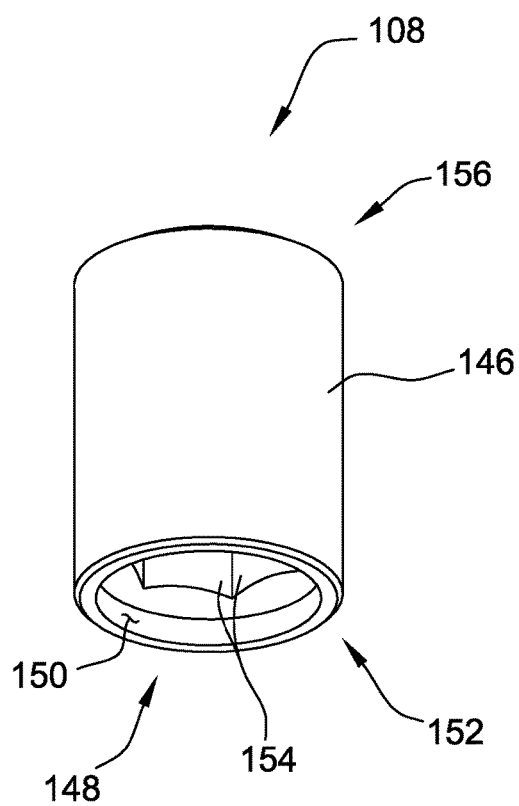
FIG. 11 is a lower perspective view of the tool of FIG. 10.
Figure 12:
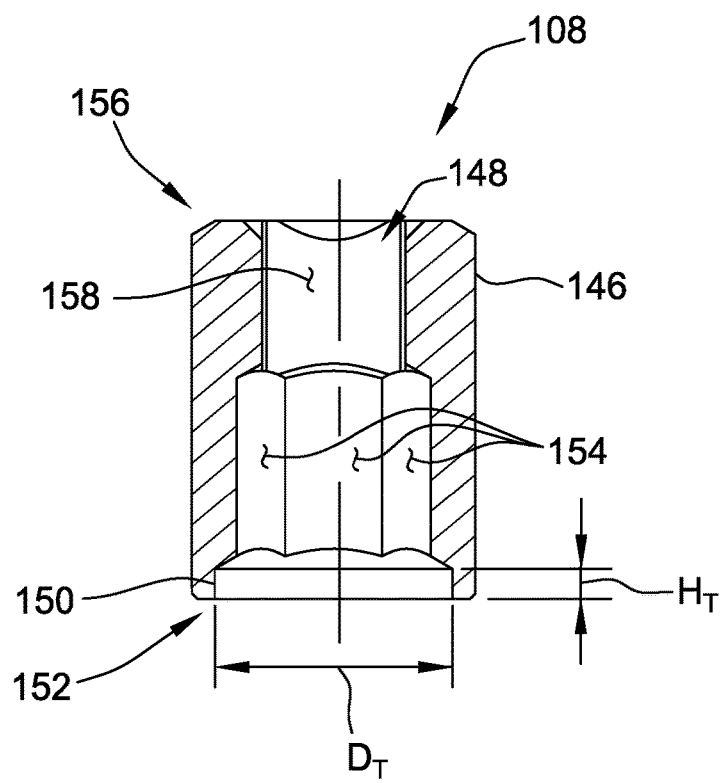
FIG. 12 is a sectional view of the tool of FIG. 10.

With reference to FIG. 2, tool 108 is configured for engaging both lock nut 106 and lock washer 104 to facilitate installation and removal of lock nut 106 from fastener assembly 100. With reference to FIGS. 10-12, in the exemplary embodiment, tool 108 includes a body 146 having a stepped bore 148 extending axially therethrough. Stepped bore 148 includes a cylindrical portion 150 at a first end 152 of body 146. Cylindrical portion 150 has a diameter "$D_t$" configured to receive flange 132 of lock nut 106 therein. In particular, diameter "$D_t$" is greater than diameter "$OD_n$" of outer edge 142 of flange 132 to enable lock nut 106 to slide freely into tool 108 in an axial direction. Cylindrical portion 150 extends axially along stepped bore 148 a predetermined distance "$H_t$" configured to facilitate receiving the entirety of lock nut 106 in stepped bore 148 such that body 146 engages outer portions 124 of lock washer 104, as is described herein. Stepped bore 148 also includes wrenching surfaces 154 extending from cylindrical portion 150 toward a second end 156 of body 146. At second end 156, stepped bore 148 includes a driver connection 158 for receiving driving torque from a driving member (not shown), such as a ratchet. Wrenching surfaces 154 correspond in shape and size, are configured, to engage body 130 of lock nut 106. In the exemplary embodiment, driver connection 158 is a square-shaped bore. Alternatively, driver connection 158 has any shape that enables tool 108 to function as described herein.

Figure 13:
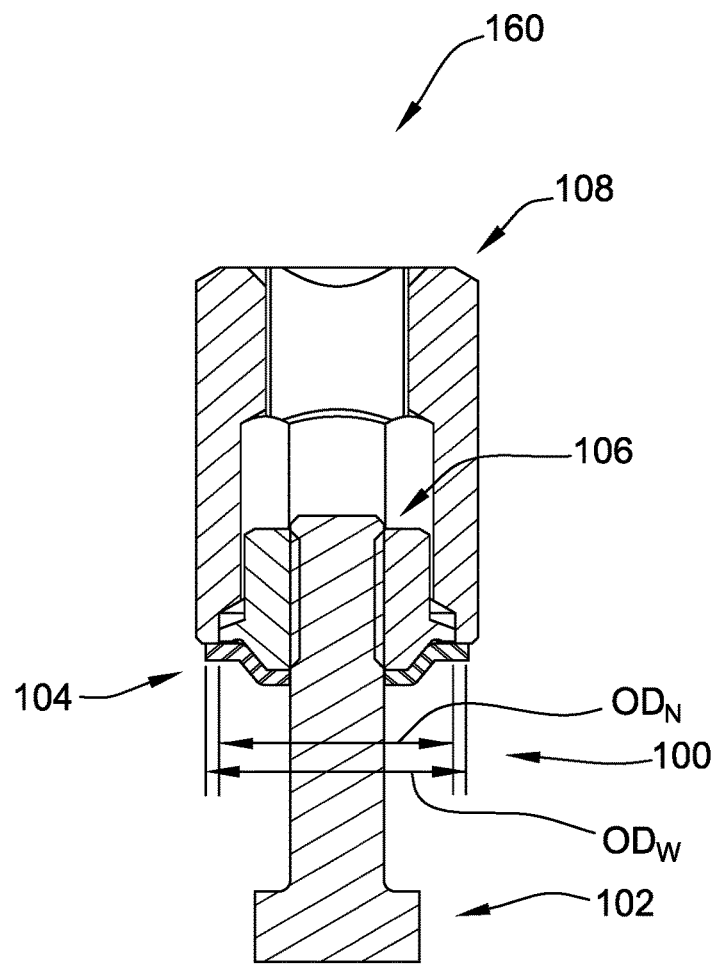
FIG. 13 is a sectional view of the fastener assembly of FIG. 1, showing the lock washer in a first orientation.
Figure 14:
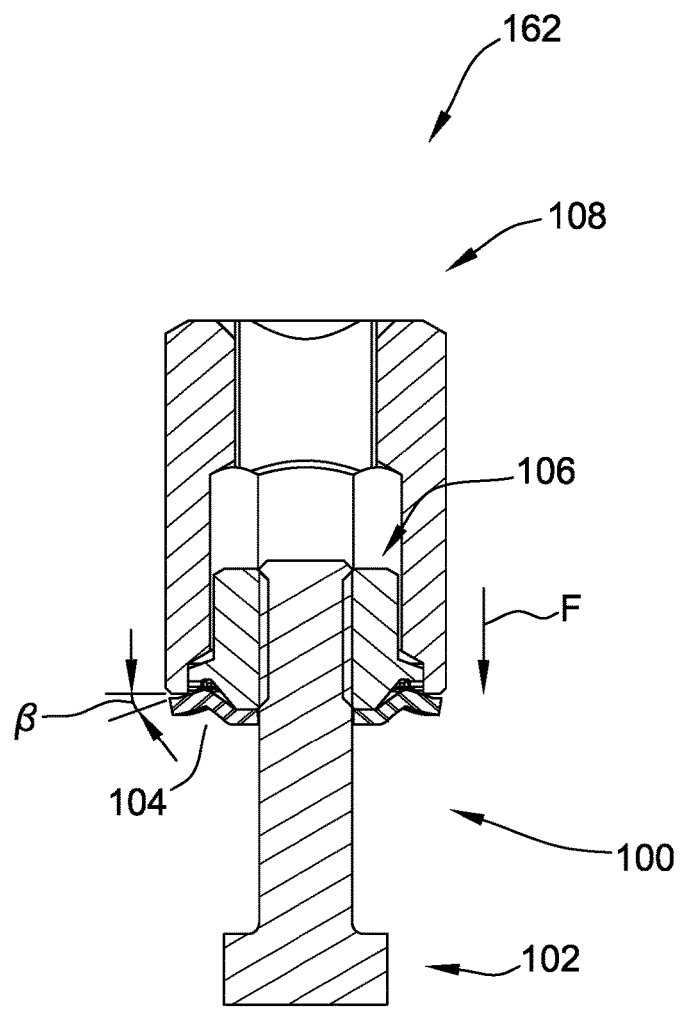
FIG. 14 is a sectional view of the fastener assembly of FIG. 1, showing the lock washer in a second orientation.

FIG. 13 is a sectional view of fastener assembly 100 showing lock washer 104 in a first orientation 160, where lock nut 106 is engaged with lock washer 104 and rotationally fixed. FIG. 14 is a sectional view of fastener assembly 100 showing lock washer 104 in a second orientation 162, where tool 108 is engaged with outer portions 124 of lock washer 104. In the exemplary embodiment, lock washer 104 is movable between first orientation 160 and second orientation 162. In first orientation 160, teeth 144 formed in flange 132 of lock nut 106 engage (i.e., extend into) locking apertures 128 defined in outer portions 124 of lock washer 104. Engaging teeth 144 with locking apertures 128 facilitates rotationally fixing lock nut 106 relative to lock washer 104. In addition, lock washer 104 is rotationally fixed to threaded member 102 via the engagement of anti-rotation structures 122 to the pair of opposing longitudinally extending anti-rotation features 114 of threaded body portion 112 of threaded member 102. Accordingly, lock nut 106 is rotationally fixed relative to threaded member 102 in first orientation 160 of fastener assembly 100.

In the exemplary embodiment, "$OD_w$" is greater than "$OD_n$" such that tool 108 facilitates providing an axial force "F" to outer potions 124. Force "F" facilitates bending or flexing outer portions 124 from first orientation 160 to second orientation 162. Second orientation 162 is offset from first position 160 by an angle "β" of sufficient magnitude to facilitate disengaging teeth 144 from locking apertures 128, thereby allowing lock nut 106 to freely rotate relative to lock washer 104 and threaded member 102.

Figure 15:
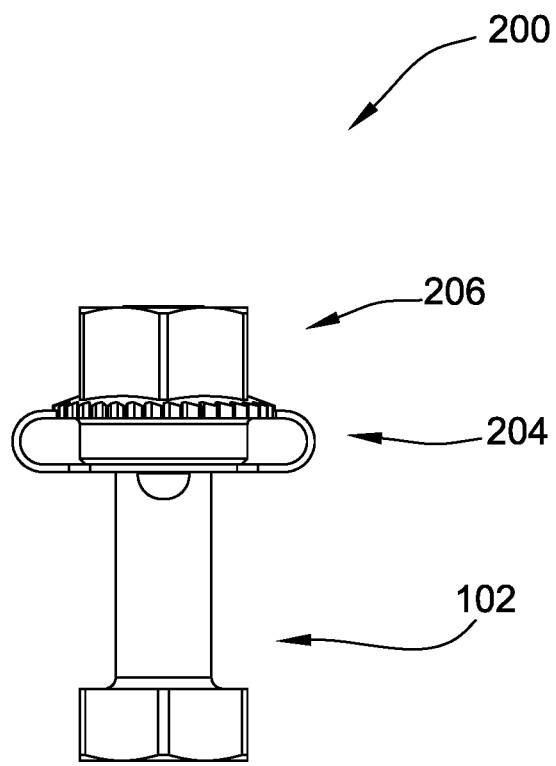
FIG. 15 is a side view of an alternative exemplary embodiment of a fastener assembly.
Figure 16:
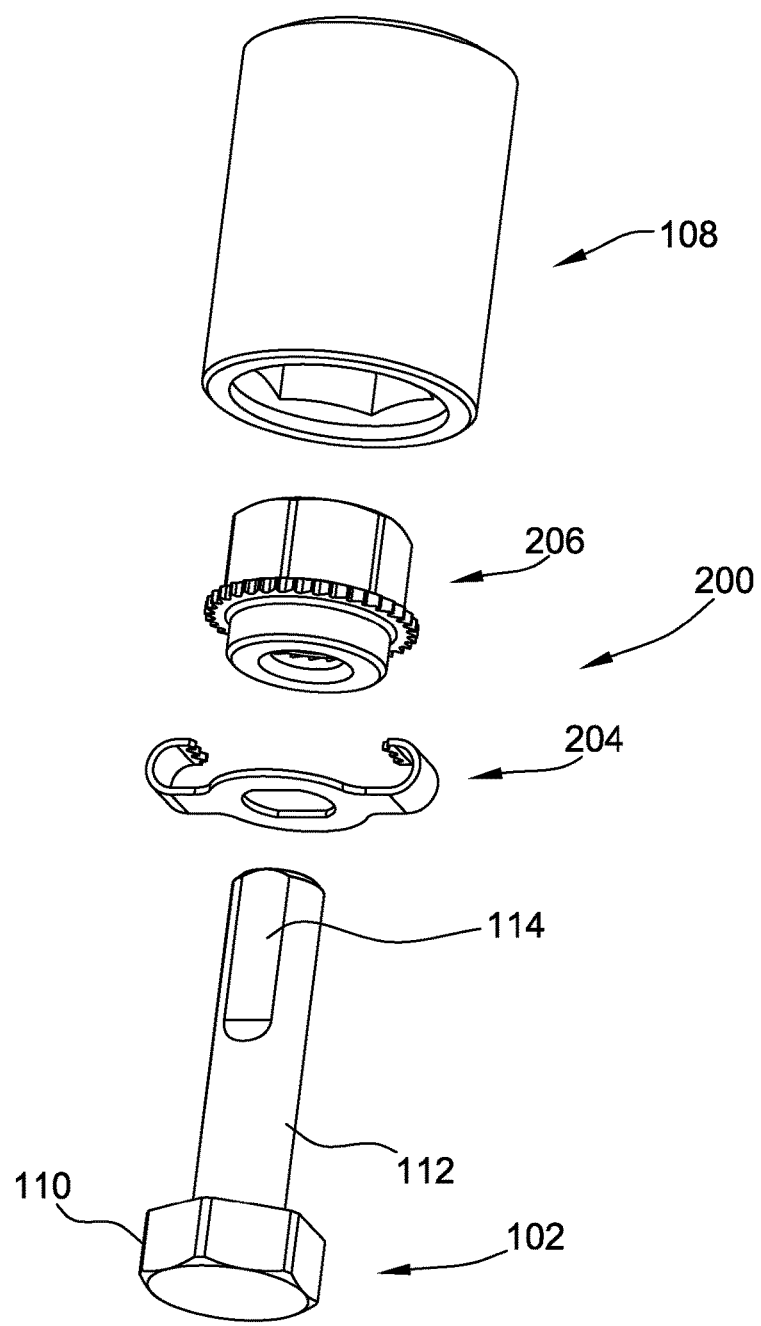
FIG. 16 is an exploded perspective view of the fastener assembly shown in FIG. 15, including a tool for use with the fastener assembly.
Figure 17:
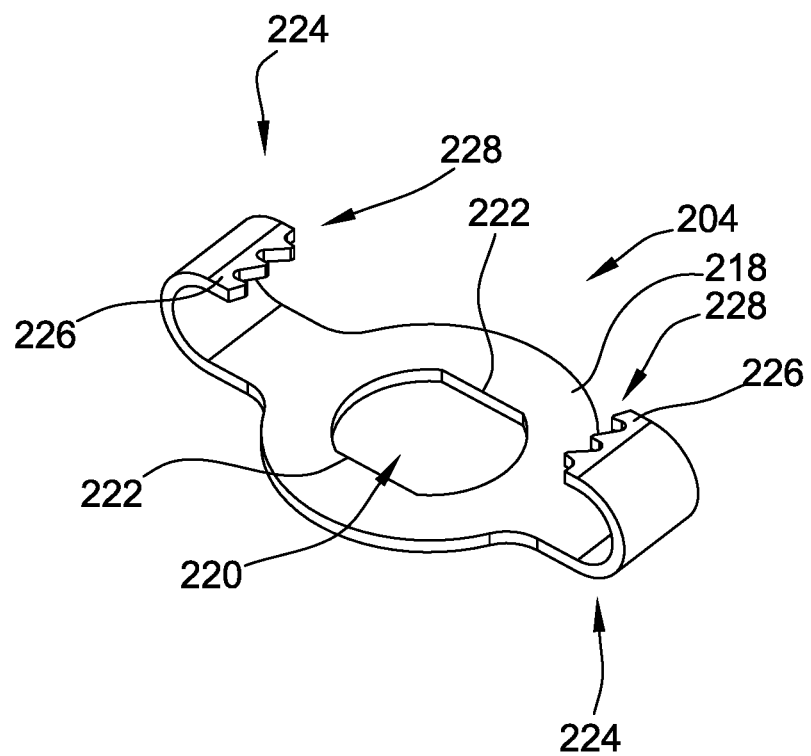
FIG. 17 is a perspective view of a lock washer of the fastener assembly of FIG. 15.
Figure 18:
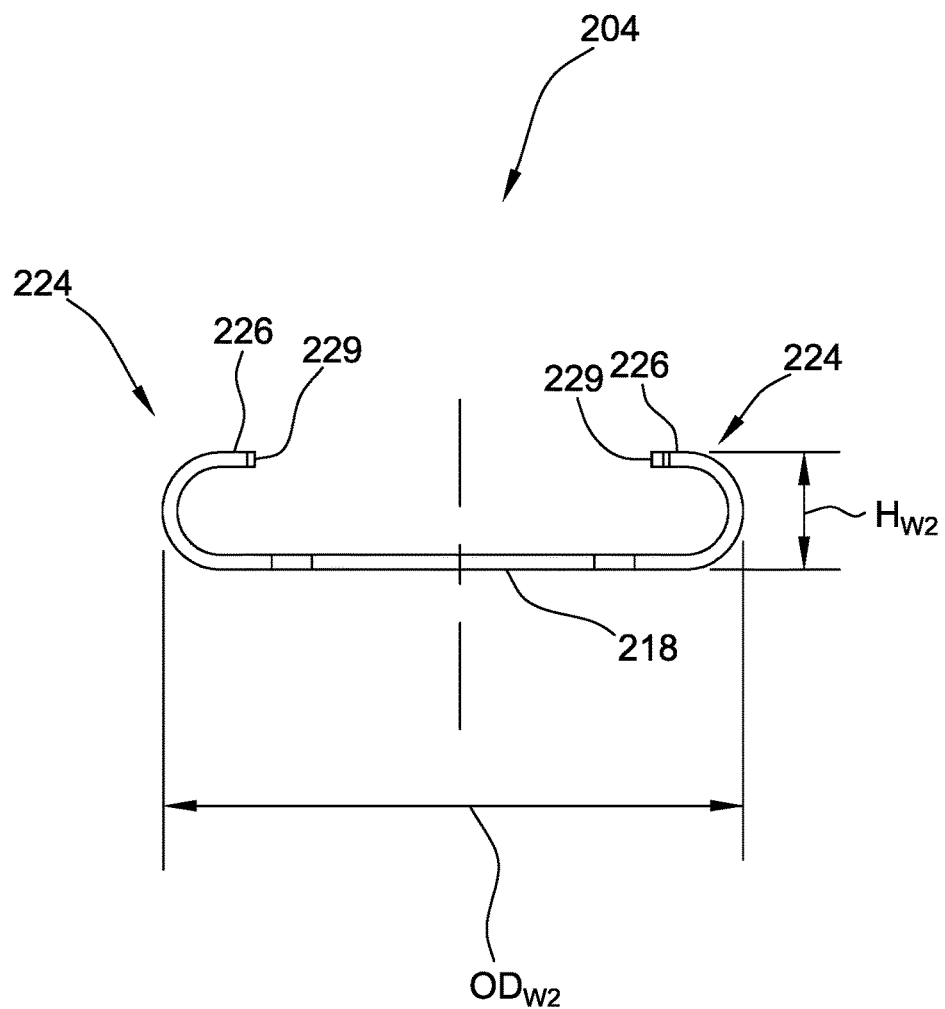
FIG. 18 is a front view of the lock washer of FIG. 17.
Figure 19:
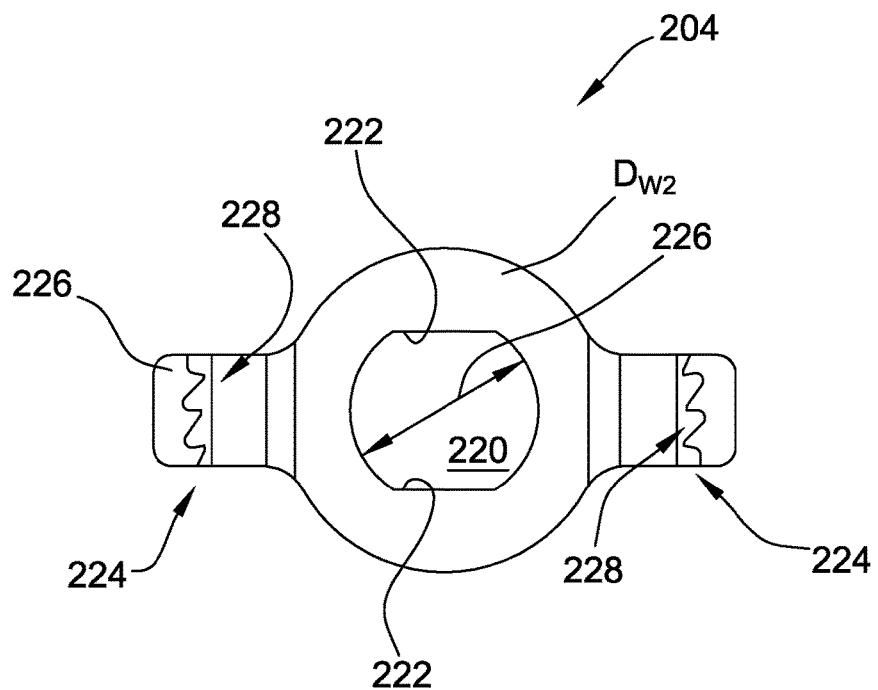
FIG. 19 is a top view of the lock washer of FIG. 17.

FIG. 15 is a side view of an alternative exemplary embodiment of a fastener assembly 200. FIG. 16 is an exploded perspective view of fastener assembly 200, including tool 108 for use with fastener assembly 200. In the exemplary embodiment, fastener assembly 200 includes threaded member 102, a lock washer 204, a lock nut 206, and tool 108. With reference to FIGS. 15 and 16, lock washer 204 is configured to slidably couple to anti-rotation features 114 of threaded body portion 112 for axial movement along threaded body portion 112. Anti-rotation features 114 facilitate rotationally fixing lock washer 204 relative to the threaded member 102. With reference to FIGS. 17-19, lock washer 204 includes a central portion 218 defining an axial aperture 220 therethrough. Axial aperture 220 is sized to facilitate freely sliding lock washer 204 onto threaded body portion 112 of threaded member 102. As such, axial aperture 220 has a diameter "$D_{w2}$" slightly greater than diameter "D" of threaded body portion 112. Axial aperture 220 also includes an anti-rotation structure 222 configured to engage anti-rotation feature 114 of threaded member 102. It is contemplated that anti-rotation structure 222 includes, for example, and without limitation, a finger, member, or any other component configured to engage anti-rotation feature 114, for example, flats, notches, or grooves. In the exemplary embodiment, anti-rotation structure 122 includes a pair of opposing flat inner surfaces sized and shaped to correspond to the pair of opposing longitudinally extending anti-rotation features 114 of threaded body portion 112. Anti-rotation features 114 slidably couple with anti-rotation structures 122 of lock washer 204 to rotationally fix lock washer 204 when threaded body portion 112 is inserted in axial aperture 220. As such, lock washer 204 moves freely along threaded body portion 112 in the axial direction.

In the exemplary embodiment, lock washer 204 includes an outer portion 224 having an outer diameter or width "$OD_{w2}$." In the exemplary embodiment, outer portion 224 includes a pair of opposing outer tabs that generally define the outer width "$OD_{w2}$" of lock washer 204. Alternatively, outer portion 224 can be a full circumferential portion or any number of smaller radial portions or tabs that enable lock washer 204 to function as described herein. In the exemplary embodiment, outer portion 224 includes a pair of opposing outer tabs. Outer portions 224 extend outward from central portion 218 and turn upward in an axial direction, curving back toward central portion 218. In particular, outer potions 224 form a 180° radius, such that outer portions 224 point back toward central portion 218. Outer potions 224 extend upward a predetermined height "$H_{w2}$," which corresponds to a size of lock nut 206, such that lock washer 204 couples to lock nut 206, as described herein. Outer portions 224 include a top surface 226 that is substantially parallel to central portion 218. A plurality if locking teeth 228 are defined in a respective end 229 of each outer portion 224. Teeth 228 are sized and shaped to correspond to teeth 244 (shown in FIGS. 20-22) of lock nut 206. In the exemplary embodiment, teeth 228 are configured to facilitate preventing counter-clockwise rotation of lock nut 206. Alternatively, teeth 228 are configured to facilitate preventing rotation of lock nut 206 in the clockwise direction, or both the counter-clockwise and the clockwise directions.

Figure 20:
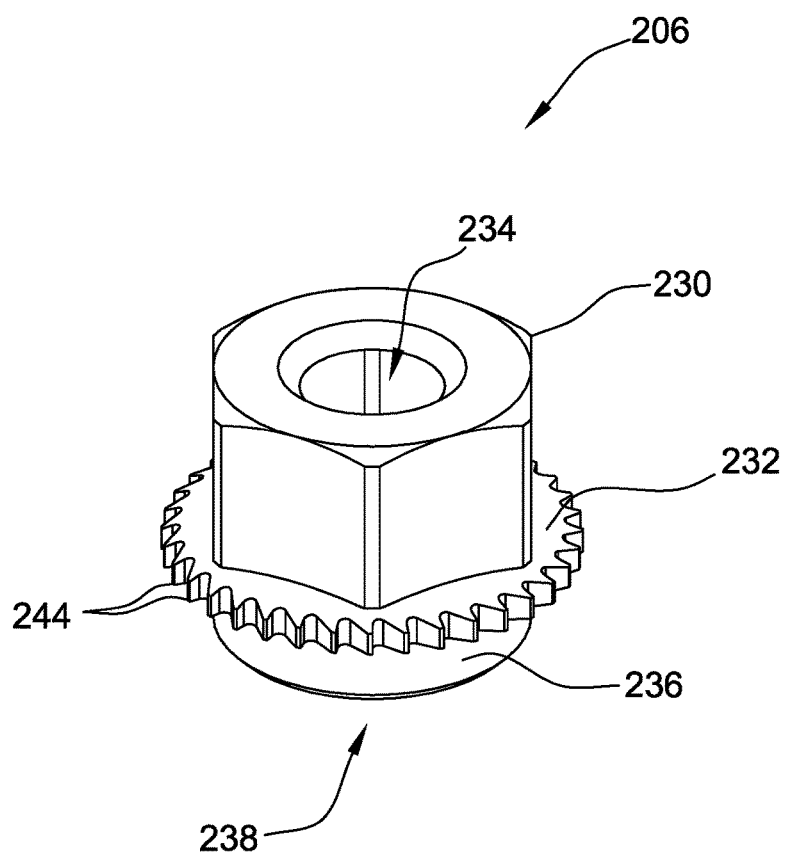
FIG. 20 is a perspective view of a lock nut of the fastener assembly of FIG. 15.
Figure 21:
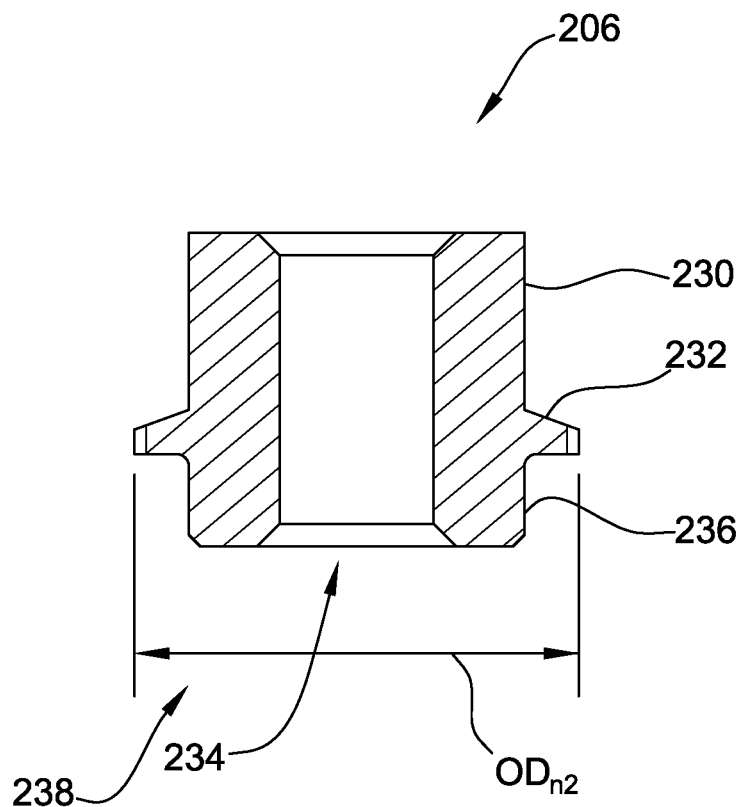
FIG. 21 is a front view of the lock nut of FIG. 20.
Figure 22:
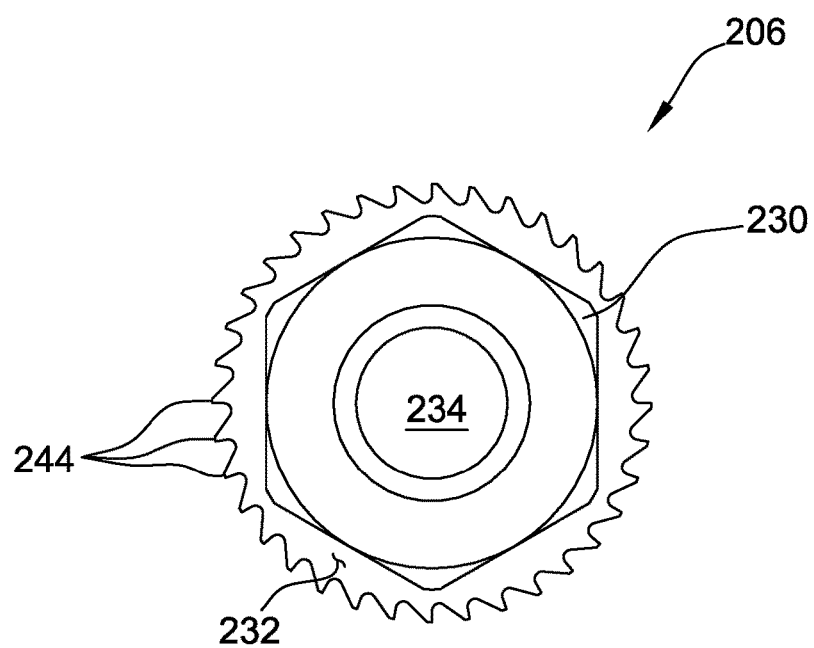
FIG. 22 is a top view of the lock nut of FIG. 20.

With reference to FIGS. 15 and 16, lock nut 206 is configured to be threadably received by threaded member 102 over threaded body portion 112 and is rotationally free or rotationally fixed relative to threaded member 102 depending upon whether lock nut 206 is engaged with or disengaged from lock washer 204. With reference to FIGS. 20-22, lock nut 206 includes a body 230 and a transversely extending flange 232 proximate a first end 238 of lock nut 206. In the exemplary embodiment, flange 232 is integrally formed with body 230. Alternatively, as described above, flange 232 can be separately formed from body 230 and releasably coupled to body 230. In such an embodiment, flange 232 is rotationally fixed to body 230 via engagement of one or more anti-rotation features, such as anti-rotation features 164, to one or more corresponding anti-rotation structures, such as anti-rotation structures 166. In alternative embodiments, lock nut 206 is free of flange 132. In the exemplary embodiment, body 230 includes a threaded bore 234 extending axially through lock nut 206. Lock nut 206 includes a cylindrical bearing surface 236 formed at first end 238, below flange 232. In the exemplary embodiment, cylindrical bearing surface 236 is configured to engage central portion 218 of lock washer 204. Body 230 is formed as a hexagonal-shaped body, although other configurations of body 230 are contemplated.

In the exemplary embodiment, flange 232 includes a plurality of radially extending teeth 244 formed through flange 232. In particular, teeth 244 extend radially outward from body 230 in equal, circumferentially-spaced relationships to each other, and define an outer diameter "$OD_{n2}$." Teeth 244 are configured to facilitate preventing counter-clockwise rotation of lock nut 206 when engaged with locking teeth 228 of lock washer 204. Alternatively, teeth 244 are configured to facilitate preventing rotation of lock nut 206 in the clockwise direction, or both the counter-clockwise and the clockwise directions. In the exemplary embodiment, lock nut 206 includes thirty-six teeth 244. Alternatively, lock nut 206 has any number of teeth 244 that enable lock nut 206 to function as described herein.

In the exemplary embodiment, lock washer 204 and lock nut 206 are fabricated from a metal, for example, and without limitation, steel, aluminum, titanium, or a superalloy. Alternatively, threaded member 102, lock washer 204, and lock nut 206 are fabricated from any material that enables fastener assembly 100 to function as described herein, such as, without limitation, composite materials, resins, fiber reinforced resins, plastics, and fiber reinforced plastics.

Figure 23:
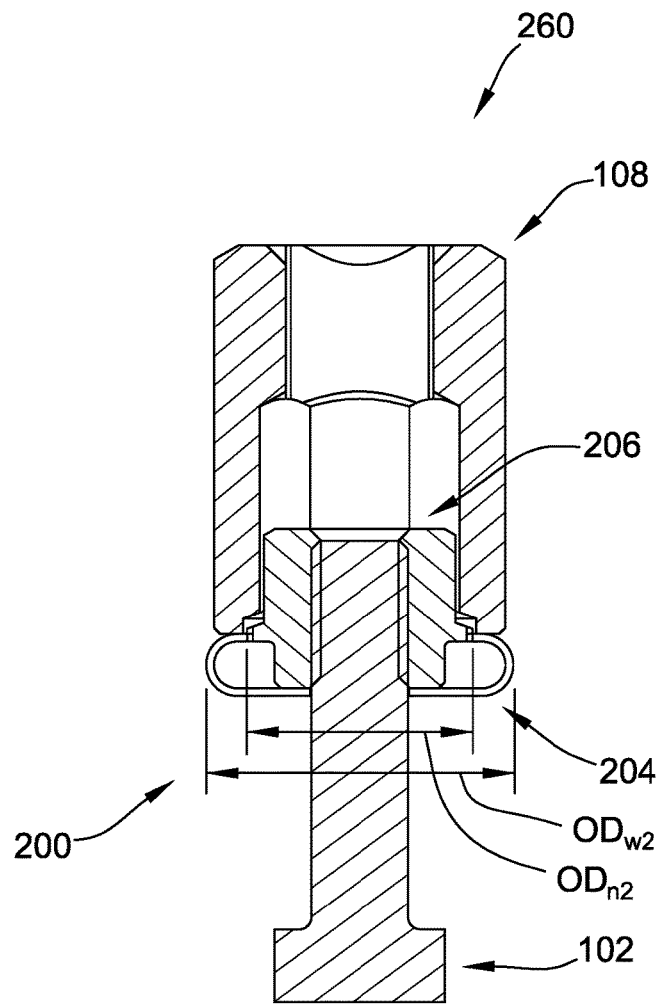
FIG. 23 is a sectional view of the fastener assembly of FIG. 15, showing the lock washer in a first orientation.
Figure 24:
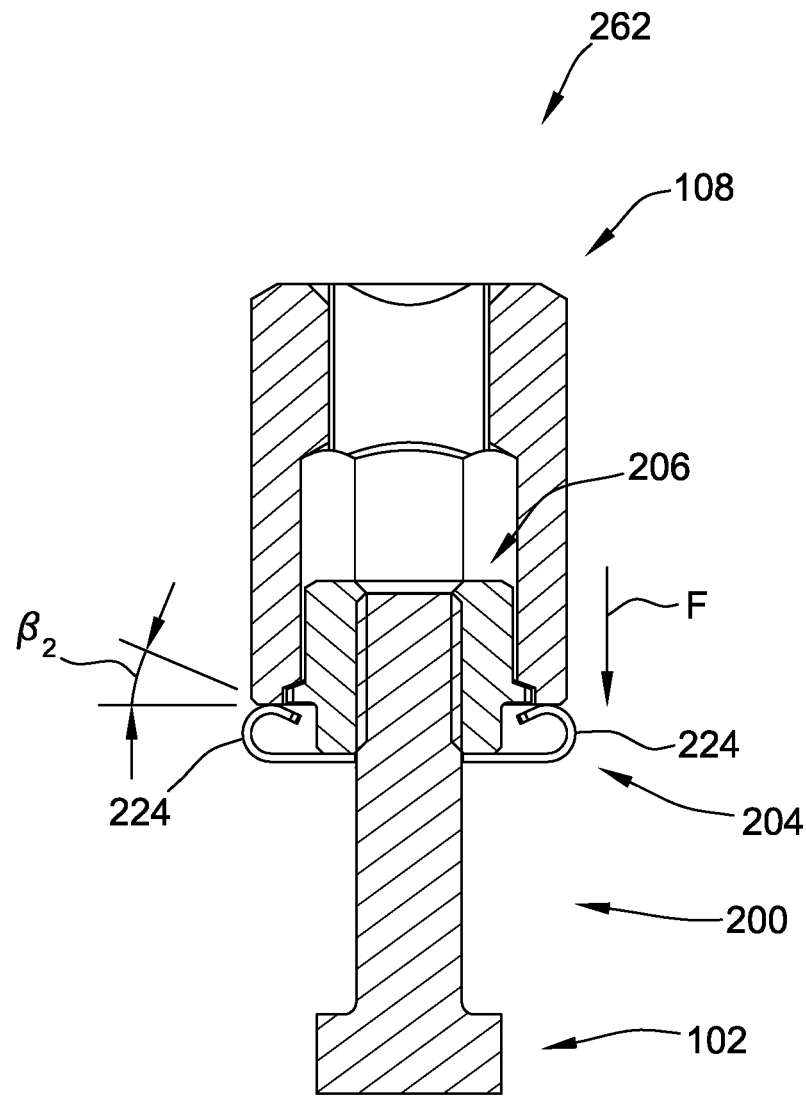
FIG. 24 is a sectional view of the fastener assembly of FIG. 15, showing the lock washer in a second orientation.

FIG. 23 is a cross-sectional side elevation view of fastener assembly 200 showing lock washer 204 in a first orientation 260, where lock nut 206 is engaged with lock washer 204 and rotationally fixed. FIG. 24 is a cross-sectional side elevation view of fastener assembly 100 showing lock washer 204 in a second orientation 262, where tool 108 is engaged with outer portions 224 of lock washer 204. In the exemplary embodiment, lock washer 204 is movable between first orientation 260 and second orientation 262. In first orientation 260, teeth 244 formed in flange 232 of lock nut 206 engage (i.e., mesh with) locking teeth 228 defined in outer portions 224 of lock washer 204. Engaging teeth 244 with locking teeth 228 facilitates rotationally fixing lock nut 206 relative to lock washer 204. In addition, lock washer 204 is rotationally fixed to threaded member 102 via the engagement of anti-rotation structures 222 to the pair of opposing longitudinally anti-rotation features 114 of threaded body portion 112 of threaded member 102. Accordingly, lock nut 206 is rotationally fixed relative to threaded member 102 in first orientation 260 of fastener assembly 100.

In the exemplary embodiment, "$OD_{w2}$" is greater than "$OD_{n2}$" such that tool 108 facilitates providing an axial force "F" to outer portions 224. More specifically, tool first end 152 of body 146 engages the respective ends 229 of outer portions 224 such that force "F" facilitates bending or flexing ends 229 of outer potions 224 from first orientation 260 to second orientation 262. Second orientation 262 is offset from first position 260 by an angle "$\beta_2$" of sufficient magnitude to facilitate disengaging locking teeth 228 from teeth 244 of lock nut 206, thereby facilitating lock nut 206 to freely rotate relative to lock washer 204 and threaded member 102.

Figure 25:
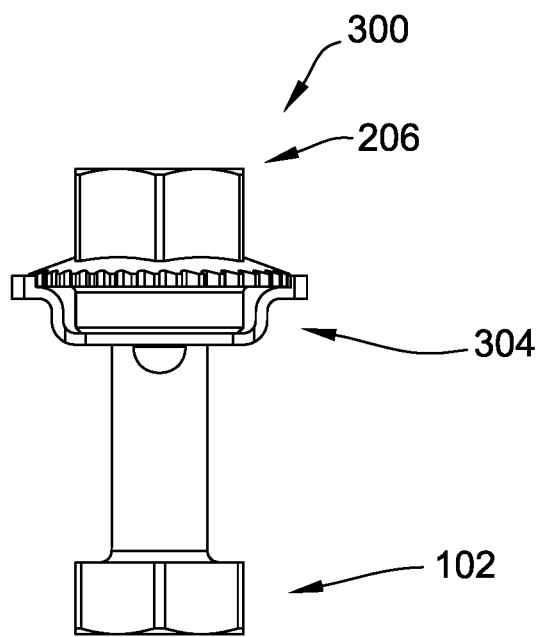
FIG. 25 is a side view of another alternative exemplary embodiment of a fastener assembly.
Figure 26:
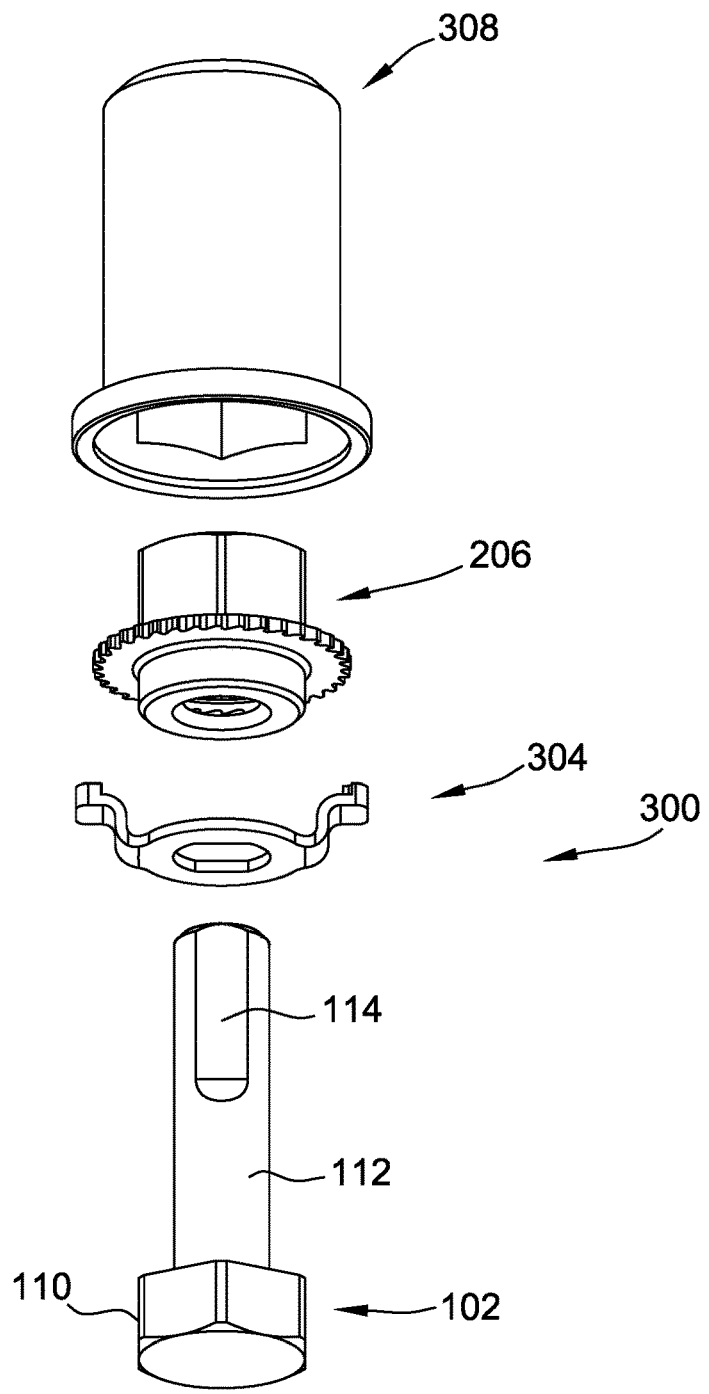
FIG. 26 is an exploded perspective view of the fastener assembly shown in FIG. 25, including a tool for use with the fastener assembly.
Figure 27:
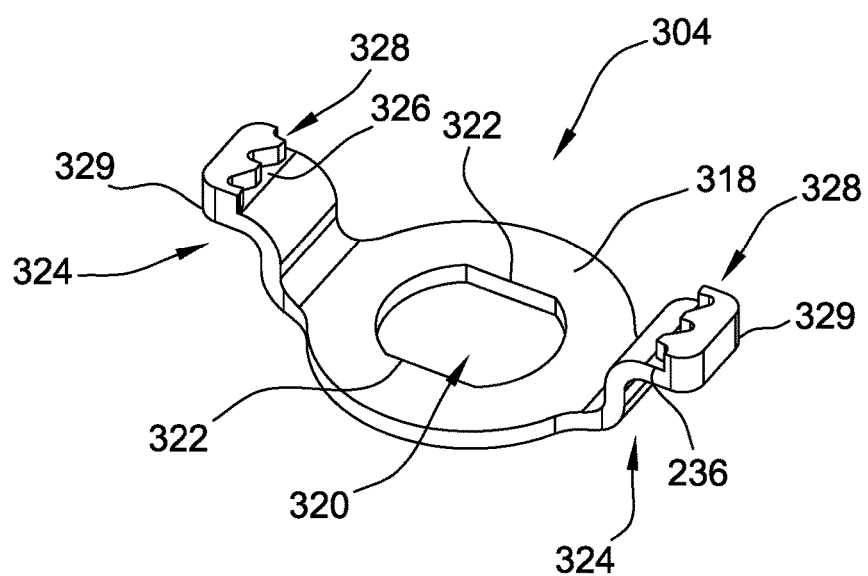
FIG. 27 is a perspective view of a lock washer of the fastener assembly of FIG. 25.
Figure 28:
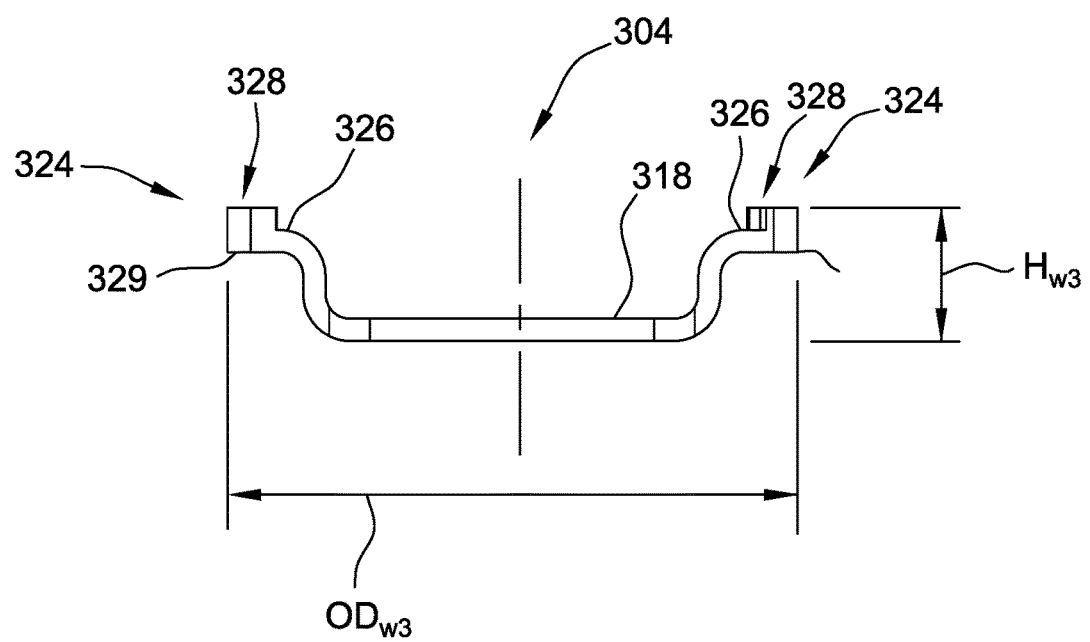
FIG. 28 is a front view of the lock washer of FIG. 27.
Figure 29:
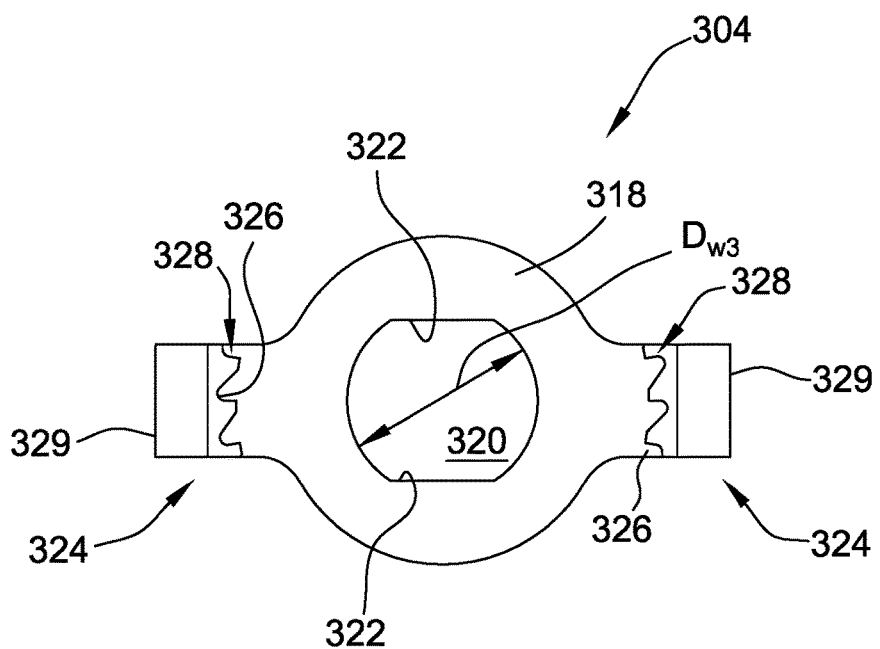
FIG. 29 is a top view of the lock washer of FIG. 27.

FIG. 25 is a side view of another alternative exemplary embodiment of a fastener assembly 300. FIG. 26 is an exploded perspective view of fastener assembly 300, including a tool 308 for use with fastener assembly 300. In the exemplary embodiment, fastener assembly 300 includes threaded member 102, a lock washer 304, lock nut 206, and a tool 308. With reference to FIGS. 25 and 26, lock washer 304 is configured to slidably couple to anti-rotation features 114 of threaded body portion 112 for axial movement along threaded body portion 112. Anti-rotation features 114 facilitate rotationally fixing lock washer 304 relative to the threaded member 102. With reference to FIGS. 27-30, lock washer 304 includes a central portion 318 defining an axial aperture 320 therethrough. Axial aperture 320 is sized to facilitate freely sliding lock washer 304 onto threaded body portion 112 of threaded member 102. As such, axial aperture 320 has a diameter "$D_{w3}$" slightly greater than diameter "D" of threaded body portion 112. Axial aperture 320 also includes an anti-rotation structure 322 configured to engage anti-rotation features 114 of threaded member 102. It is contemplated that anti-rotation structure 322 includes, for example, and without limitation, a finger, member, or any other component configured to engage anti-rotation features 114, for example, flats, notches, or grooves. In the exemplary embodiment, anti-rotation structure 122 includes a pair of opposing flat inner surfaces sized and shaped to correspond to the pair of opposing longitudinally extending anti-rotation features 114 of threaded body portion 112. Anti-rotation features 114 slidably couple with anti-rotation structures 122 of lock washer 304 to rotationally fix lock washer 304 when threaded body portion 112 is inserted in axial aperture 320. As such, lock washer 304 moves freely along threaded body portion 112 in the axial direction.

In the exemplary embodiment, lock washer 304 includes an outer portion 324 having an outer diameter or width "$OD_{w3}$." In the exemplary embodiment, outer portion 324 includes a pair of opposing outer tabs that generally define the outer width "$OD_{w3}$" of lock washer 304. Alternatively, outer portion 324 can be a full circumferential portion or any number of smaller radial portions or tabs that enable lock washer 304 to function as described herein. In the exemplary embodiment, outer portion 324 includes a pair of opposing outer tabs that generally define the outer width "$OD_{w3}$" of lock washer 304. Outer portions 324 extend outward from central portion 318 and turn approximately 90° upward (i.e., substantially perpendicular to central portion 318) for a predetermined height "$H_{w2}$." Outer portions 324 then turn outward, defining an end portion 329 that is substantially parallel to central portion 318. Height "$H_{w2}$" corresponds to a size of lock nut 206, such that lock washer 304 couples to lock nut 206, as described herein. End portions 329 of outer portions 324 include a top surface 326 that is substantially parallel to central portion 318. A plurality of locking teeth 328 extend upward from top surface 326 of each outer portion 324. Teeth 328 extend inward generally toward central portion 318 and are sized and shaped to correspond to teeth 244 (shown in FIGS. 20-22) of lock nut 206. In the exemplary embodiment, teeth 328 are configured to facilitate preventing counter-clockwise rotation of lock nut 206. Alternatively, teeth 328 are configured to facilitate preventing rotation of lock nut 206 in the clockwise direction, or both the counter-clockwise and the clockwise directions.

In the exemplary embodiment, lock washer 304 is fabricated from a metal, for example, and without limitation, steel, aluminum, titanium, or a superalloy. Alternatively, lock washer 304 is fabricated from any material that enables fastener assembly 300 to function as described herein, such as, without limitation, composite materials, resins, fiber reinforced resins, plastics, and fiber reinforced plastics.

Figure 30:
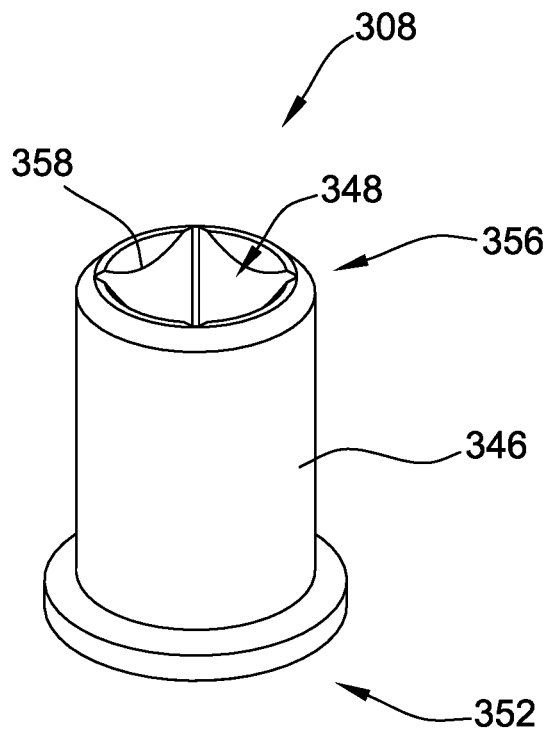
FIG. 30 is an upper perspective view of a tool for use with the fastener assembly of FIG. 25.
Figure 31:
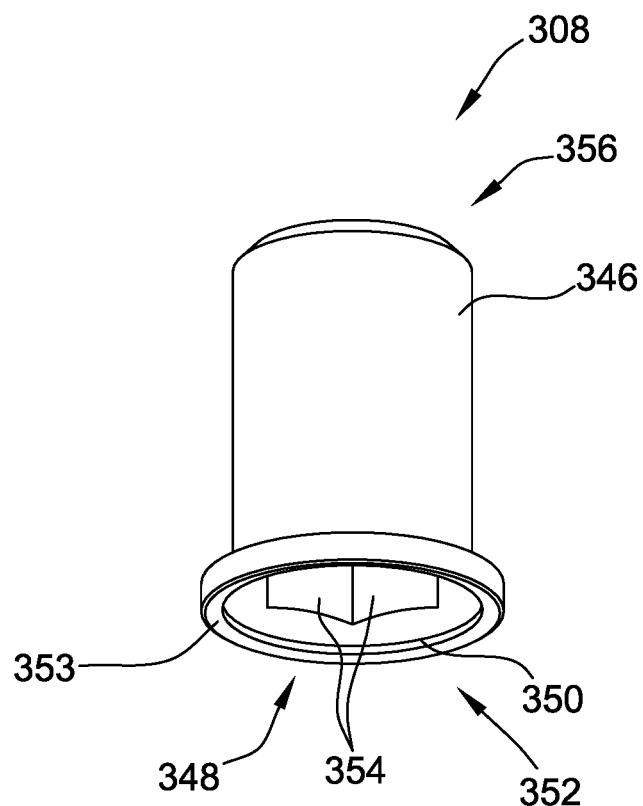
FIG. 31 is a lower perspective view of the tool of FIG. 30.
Figure 32:
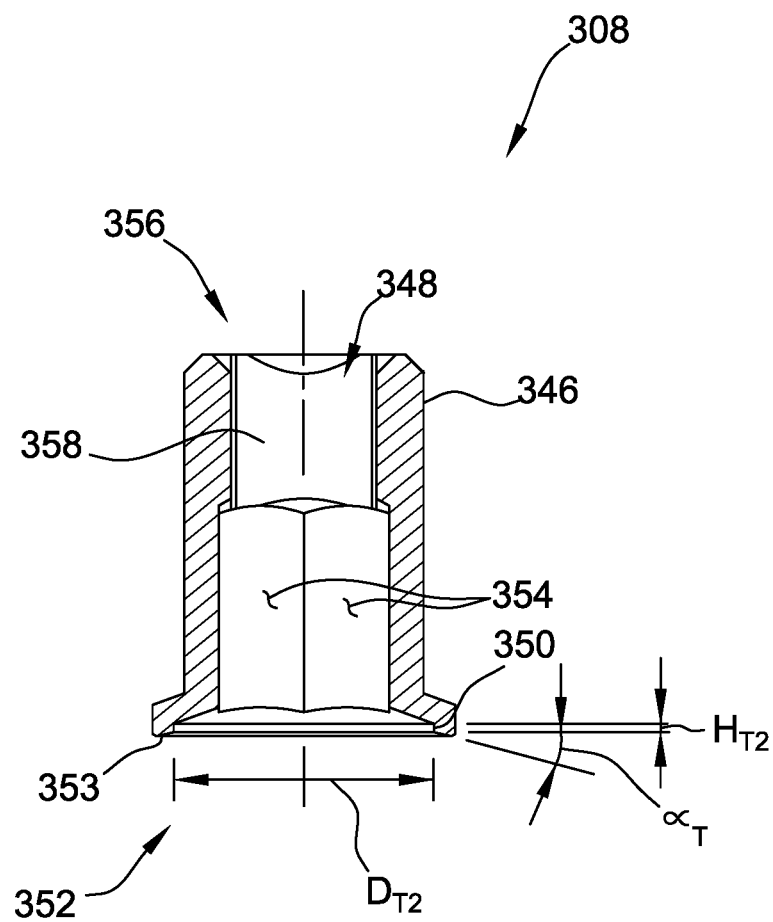
FIG. 32 is a sectional view of the tool of FIG. 30.

With reference to FIG. 26, tool 308 is configured for engaging both lock nut 206 and lock washer 304 to facilitate installation and removal of lock nut 206 from fastener assembly 300. With reference to FIGS. 30-32, in the exemplary embodiment, tool 308 includes a body 346 having a stepped bore 348 extending axially therethrough. Stepped bore 348 includes a cylindrical portion 350 at a first end 352 of body 346. Cylindrical portion 350 has a diameter "$D_{t2}$" configured to receive flange 232 of lock nut 206 therein. In particular, diameter "$D_{t2}$" is greater than diameter "$OD_{n2}$" of the outer extent of teeth 244 of flange 232 to enable lock nut 206 to slide freely into tool 308 in an axial direction. Cylindrical portion 350 extends axially along stepped bore 148 a predetermined distance "$H_t$" configured to facilitate receiving the entirety of lock nut 206 in stepped bore 348 such that body 346 engages outer portions 324 of lock washer 304, as is described herein. A sloped engaging surface 353 extends radially outward from a lower edge of cylindrical portion 350 to first end 352 of body 346. In the exemplary embodiment, sloped engaging surface 353 is sloped at an angle "$\alpha_t$" with respect to a plane coincident with first end 352. Sloped engaging surface 353 is configured to engage outer portions 324, and in particular, teeth 328 of lock washer 304, thereby deflecting outer portions 324 downward into face-to-face contact to facilitate disengaging lock washer 304 from lock nut 206.

Stepped bore 348 also includes wrenching surfaces 354 extending from cylindrical portion 350 toward a second end 356 of body 346. At second end 356, stepped bore 348 includes a driver connection 358 for receiving driving torque from a driving member (not shown). Wrenching surfaces 354 correspond in shape and size, and are configured, to engage body 230 of lock nut 206. In the exemplary embodiment, driver connection 358 is a square-shaped bore. Alternatively, driver connection 358 has any shape that enables tool 308 to function as described herein.

Figure 33:
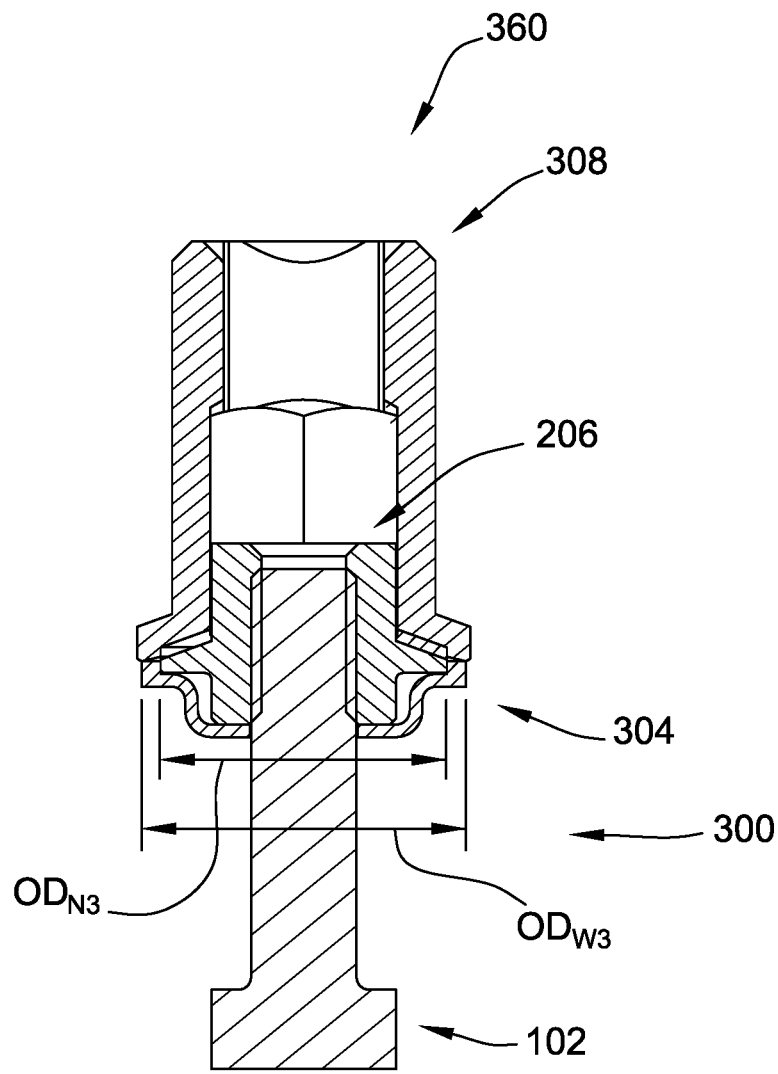
FIG. 33 is a sectional view of the fastener assembly of FIG. 25, showing the lock washer in a first orientation.
Figure 34:
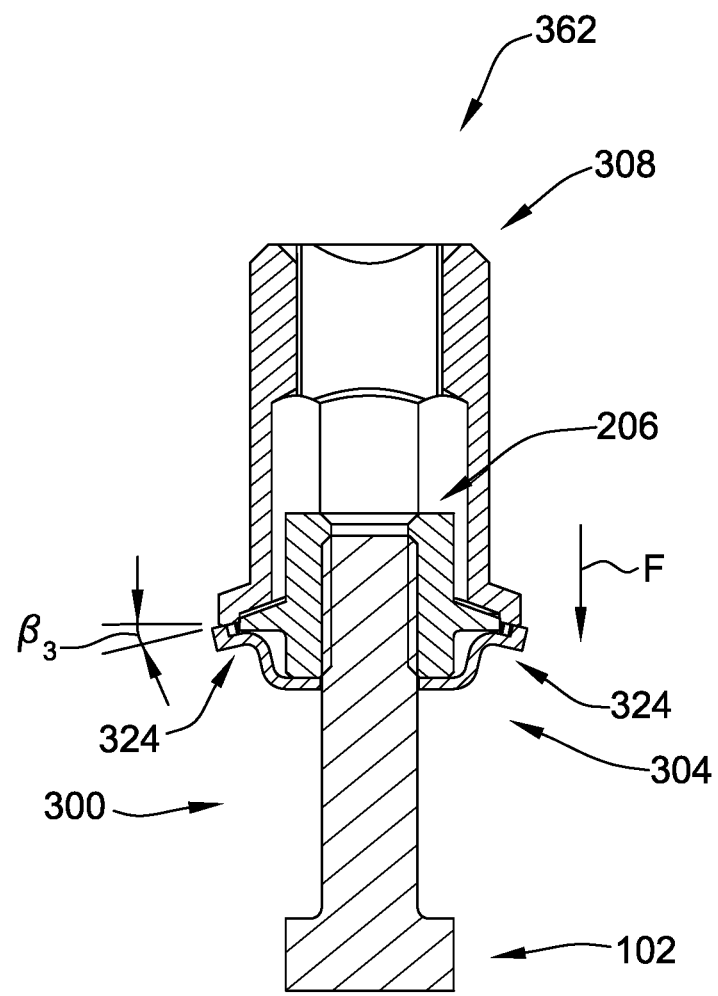
FIG. 34 is a sectional view of the fastener assembly of FIG. 25, showing the lock washer in a second orientation.

FIG. 33 is a sectional view of fastener assembly 300 showing lock washer 304 in a first orientation 360, where lock nut 206 is engaged with lock washer 304 and rotationally fixed. FIG. 34 is a sectional view of fastener assembly 300 showing lock washer 304 in a second orientation 362, where tool 308 is engaged with outer portions 324 of lock washer 304. In the exemplary embodiment, lock washer 304 is movable between first orientation 360 and second orientation 362. In first orientation 360, teeth 244 formed in flange 232 of lock nut 206 engage (i.e., mesh with) locking teeth 328 formed on outer portions 324 of lock washer 304. Engaging teeth 244 with locking teeth 328 facilitates rotationally fixing lock nut 206 relative to lock washer 304. In addition, lock washer 304 is rotationally fixed to threaded member 102 via the engagement of anti-rotation structures 322 to the pair of opposing longitudinally extending anti-rotation features 114 of threaded body portion 112 of threaded member 102. Accordingly, lock nut 206 is rotationally fixed relative to threaded member 102 in first orientation 360 of fastener assembly 300.

In the exemplary embodiment, "$OD_{w3}$" is greater than "$OD_{n2}$" such that tool 308 facilitates providing an axial force "F" to outer portions 324. More specifically, sloped engaging surface 353 of tool 308 at first end 352 engages the respective locking teeth 328 of outer portions 324 such that apply a force "F" facilitates bending or flexing outer portions 324 from first orientation 360 to second orientation 362. Second orientation 362 is offset from first position 360 by an angle "$\beta_3$" of sufficient magnitude to facilitate disengaging locking teeth 328 from teeth 244 of lock nut 206, thereby facilitating lock nut 206 to freely rotate relative to lock washer 304 and threaded member 102.

The components as described herein provide locking and vibration resistant fastener assemblies. For example, as described in the embodiments herein, when the tool is removed from the associated fastener assembly, teeth on the lock nut again engage the locking apertures/teeth of the respective lock washer. When the teeth are engaged, the lock nut is locked in rotation due to the rotational locking relationship of the lock washer to the threaded member. When the teeth are disengaged from the locking apertures/teeth, the lock nut is rotationally free relative to the threaded member. As will be appreciated by those of skill in the art in view of the present disclosure, the arrangements shown in FIGS. 1-34 facilitate preventing over deflection of the lock washers in response to the force "F" applied by tool.

Exemplary embodiments of systems and methods for rotationally locked fastener assemblies are described above. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fastener assembly comprising:
a threaded member comprising a threaded body portion and at least one anti-rotation feature formed in said threaded body portion;
a lock nut configured to threadably engage said threaded member, said lock nut comprising a body and a plurality of radially extending teeth; and
a lock washer comprising a central portion and at least one outer portion, said central portion comprising an aperture extending therethrough, said central portion comprising at least one anti-rotation structure configured to slidably engage said at least one anti-rotation feature of opposing said threaded member and rotationally fix said lock washer with respect to said threaded member, said at least one outer portion comprising an end having a plurality of teeth defined therethrough, said at least one outer portion extending outward from said central portion and comprising a 180° bend, wherein said plurality of teeth extend toward said central portion, and wherein said plurality of teeth are configured to engage said plurality of radially extending teeth of said lock nut.

2. A fastener assembly in accordance with claim 1, wherein said aperture of said lock washer has a diameter greater than a diameter of said threaded body portion.

3. A fastener assembly in accordance with claim 1 further comprising a tool, said tool comprising a body having a stepped bore extending axially therethrough, said stepped bore comprising:
a cylindrical portion at a first end of said body, said cylindrical portion configured to receive said radially extending teeth; and
a plurality of wrenching surfaces extending axially from said cylindrical portion, said plurality of wrenching surfaces configured to engage said body.

4. A fastener assembly in accordance with claim 3, wherein said stepped bore further comprises a driver connection extending axially from said plurality of wrenching surfaces, said driver connection configured to couple to a driving member.

5. A fastener assembly in accordance with claim 1, wherein said lock nut further comprises a radially extending flange, said radially extending flange rotationally fixed relative to said body.

6. A fastener assembly in accordance with claim 1, wherein said lock washer has a first orientation in which said plurality of teeth of said lock washer axe configured to engage said plurality of radially extending teeth, and a second orientation in which said plurality of teeth of said lock washer axe configured to disengage from said plurality of radially extending teeth.

7. A fastener assembly in accordance with claim 6, wherein said at least one outer portion is flexible and configured to bend between the first orientation and the second orientation.

8. A fastener assembly in accordance with claim 7, wherein said at least one outer portion includes a top surface that is substantially parallel to said central portion in the first orientation.

9. A fastener assembly in accordance with claim 8, wherein said top surface of said at least one outer portion is configured to extend at an angle relative to said central portion in the second orientation.

10. A fastener assembly in accordance with claim 6 further comprising a tool including an end, wherein said end of said tool is configured to contact and apply an axial force to said outer portion to move said lock nut between the first orientation and the second orientation.

11. A fastener assembly in accordance with claim 10, wherein said outer portion is configured to bend in response to the axial force from said tool.

* * * * *